(12) United States Patent
Olsson et al.

(10) Patent No.: US 10,653,105 B2
(45) Date of Patent: May 19, 2020

(54) ANIMAL ENCLOSURE

(71) Applicant: CHEYL PTY LTD AS TRUSTEE FOR ISAIAH 61 FAMILY TRUST, Goulburn, NSW (AU)

(72) Inventors: Ashley Norman Olsson, Darra (AU); Nathanael Dean Olsson, Darra (AU)

(73) Assignee: CHEYL PTY LTD AS TRUSTEE FOR ISAIAH 61 FAMILY TRUST, Goulburn, NSW (AU)

( * ) Notice: Subject to any disclaimer, the term of this patent is extended or adjusted under 35 U.S.C. 154(b) by 188 days.

(21) Appl. No.: 15/571,203

(22) PCT Filed: Apr. 28, 2016

(86) PCT No.: PCT/AU2016/050300
§ 371 (c)(1),
(2) Date: Nov. 1, 2017

(87) PCT Pub. No.: WO2016/176722
PCT Pub. Date: Nov. 10, 2016

(65) Prior Publication Data
US 2018/0263207 A1    Sep. 20, 2018

(30) Foreign Application Priority Data
May 1, 2015    (AU) ................ 2015901571

(51) Int. Cl.
*A01K 3/00* (2006.01)
*A01K 1/00* (2006.01)
*E06B 3/90* (2006.01)
(52) U.S. Cl.
CPC .............. *A01K 1/0029* (2013.01); *A01K 3/00* (2013.01); *E06B 3/90* (2013.01)

(58) Field of Classification Search
CPC ...... A01K 3/00; A01K 1/0613; A01K 1/0029; A01K 1/12; A01K 3/005
(Continued)

(56) References Cited

U.S. PATENT DOCUMENTS 3,460,515 A * 8/1969 Van der Heide ........ A01K 1/12
119/14.04
3,545,407 A * 12/1970 Moore ..................... A01K 3/00
119/502
(Continued)

FOREIGN PATENT DOCUMENTS

FR    2889412    2/2007

OTHER PUBLICATIONS

Written Opinion dated Sep. 6, 2016 in International Patent Application No. PCT/AU2016/050300.
(Continued)

*Primary Examiner* — Yvonne R Abbott-Lewis
(74) *Attorney, Agent, or Firm* — Byrne Poh LLP

(57) ABSTRACT

An animal enclosure (10) having a partly circular wall or fence (12), at least one barrier (36) located within the enclosure (10), the at least one barrier (36) being rotatable about a vertical axis (26), and actuation means for causing rotation of at least one of the at least one barrier (36), the actuation means being manually operable by an operator, the actuation means including a part or a portion (40) located externally of the enclosure (10) to thereby allow an operator to move the at least one barrier (36) from a location that is external to the enclosure (10). The actuation means includes a handle (40) extending externally of the enclosure (10) and a ratchet wheel operatively connected to the barrier (36).

21 Claims, 14 Drawing Sheets

(58) Field of Classification Search
USPC .......... 119/502, 840, 14.03, 14.04, 510, 518,
119/522, 752, 843
See application file for complete search history.

(56) References Cited

U.S. PATENT DOCUMENTS

| | | | |
|---|---|---|---|
| 4,275,685 A | 6/1981 | Hopkins | |
| 4,917,048 A * | 4/1990 | Beattie ................. | A01K 1/0613 |
| | | | 119/502 |
| 5,572,954 A * | 11/1996 | Elkins .................. | A01G 25/092 |
| | | | 119/502 |
| 6,021,742 A * | 2/2000 | Cummings .......... | A01K 1/0613 |
| | | | 119/502 |
| 10,327,416 B1 * | 6/2019 | Studebaker, Jr. .... | A01K 1/0029 |
| 2006/0112904 A1 | 6/2006 | Davis Mollhagen | |

OTHER PUBLICATIONS

International Search Report dated Sep. 6, 2016 in International Patent Application No. PCT/AU2016/050300.
Extended European Search Report dated Mar. 13, 2019 in EP Patent Application No. 16788948.4.

\* cited by examiner

ANIMAL ENCLOSURE

TECHNICAL FIELD

The present invention relates to an animal enclosure. More particularly, the present invention relates to an animal enclosure that includes a circular or partly circular or semi-circular wall and having at least one moveable barrier that is manually operable from outside the circular or partly circular or semicircular wall. The present invention also relates to a moveable barrier mechanism for use with an animal enclosure.

BACKGROUND ART

It will be clearly understood that, if a prior art publication is referred to herein, this reference does not constitute an admission that the publication forms part of the common general knowledge in the art in Australia or in any other country.

When handling herding animals, and in particular cattle, sheep, goats or pigs, it is often required to herd them into a set of handling yards and often within the confines of those yards there are further smaller areas for segregating the herds into smaller, more manageable numbers. Often such yard installations contain a dedicated confined space for assisting the animal handler to group the animals into a tightly packed group to perform various animal handling operations, some examples of which are counting and loading the animals into vehicles, performance of animal husbandry operations, branding, veterinary treatments, visual inspection, sorting, selling, weighing, drafting, chemical treatments and other similar animal handling operations.

To aid the herder in managing such operations safely and moving the animals efficiently it is common practice and well known in the industry that animals will flow and move more constantly and with less stress when directed or corralled to travel in a consistent circular path or motion.

It is also common practice within such animal handling and herding operations to have within the boundaries of the animal holding yards or corals, a circular or semi-circular confined space known commonly by various names, some common examples being a circular force tub, force tub, circular force, crowd, crowding pen, and are called such due to their operational nature, construction and appearance. The said circular or semi-circular structures have a defined opening at one point in their circumference to allow the animals to enter the confined circular or semi-circular area and there is also provided a defined exit at another separate opening at some further point in the circumference of the structure to allow the animals to exit the confined circular or semi-circular area after they have moved in a circular motion around the central axis without interrupting the flow of the following entering animals. The structure is so designed with a separated entrance and exit to enable the continuous flow of animals to enter into the structure, circulate around within, and exit the structure, without coming into physical or visual contact with the other entering animals who are yet to be processed within the structure. The size of the outer circumference of the structures may vary in diameter to accommodate various numbers of animals within the confined circular, semi-circular area depending on the herd size and the numbers of animals regularly handled at each property. There are also commonly installed within the circular, semi-circular confined area at least one pivoting moveable barrier (gate), such moveable barrier pivots around the inner circular space created by the outer circular structure, providing a moveable separating barrier between the two groups of livestock. The said moveable barrier is generally sheeted or clad to prevent the animals from seeing through the moveable barrier and is generally made to such a height as to prevent the animals from jumping over the moveable barrier. The moveable barrier is capable of being locked to prevent the animals from pushing against the moveable barrier and moving it in a backwards direction within the confined circular, semi-circular enclosure. The moveable barrier operates in such a fashion to firstly allow the animals to enter the confined circular, semi-circular enclosure and when the appropriate number of animals are within the confined circular, semi-circular area so as to fill it, the moveable barrier will be rotated in the same direction as the desired movement of animal travel, moving in behind the animals and thereby creating a barrier behind the first segregated group of animals and in front of the second segregated group of animals. The moveable barrier will be moved by the operator to continue to follow behind the first group of animals, until they exit the confined circular, semi-circular area.

In some devices available on the market the moveable barrier is unable to rotate in a continuous 360 degree motion, in such cases the operator is required to reverse the direction of the moveable barrier back to the starting position so as to allow the second group of animals to enter into the circular, semi-circular area and repeat the operation again and again. In some instances the operator is required to be within the confines of the circular, semi-circular area to perform the actuation of the moveable barrier.

In some more expensive and motorised installations there is a second moveable barrier to prevent the animals from heading in the opposite direction of flow, towards the exit portion of the confined area. The second moveable barrier creates a variable sized wedge shaped exclusion zone within the circular, semi-circular area. Once the first allotted group have moved in a circular motion around the circumference they are able to see the exit portion of the confined area and begin to exit the confined circular, semi-circular area and the first moveable barrier continues to rotate behind the animals to such an extent that it then moves past the exit opening and approaches the second moveable barrier which is normally situated at the commencement of the entry opening.

In these installations once the first moveable barrier moves past the furthest portion of the exit opening and all the animals have exited the confined area, the second moveable barrier then begins to move in the same direction as the intended animal flow and follows the path of the first moveable barrier, the first moveable barrier then moves into the original position of the second moveable barrier located at the commencement of the entry opening, thereby blocking off access to the exit portion for the incoming animals, and the second moveable barrier continues to move in a circular motion to follow the path of the first moveable barrier. This sequence is intended to be a continuous action allowing separated groups of animals to enter, move around the confined circular, semi-circular area and exit into another section of the yards without the possibility of them reversing direction once they are contained within the circular, semi-circular enclosure. The moveable barriers can be prevented from travelling in a backwards direction for operator safety and to ensure animals cannot move in an unintended direction.

Such confined circular, semi-circular structures are regularly constructed of materials strong enough to withstand the forces exerted on them by the animals when crowded and confined into the circular, semi-circular area. Such structures commonly have curved internally clad walls to prevent the animals from being distracted by movement outside the enclosed area or providing the animal with what they may consider as other potential paths of travel. The walls and moveable barriers are constructed to a suitable height to safely contain the animals and prevent them from jumping over the walls of the structure.

There are also commonly constructed (radial) supporting struts which emanate horizontally and then downwardly from the central axis of the said circular, semi-circular area, force tub, circular force, crowd or crowding pen structure, at a height well above the animals, such struts connect at regular intervals around the exterior walls that define the outer circumference of the confined circular, semi-circular area to provide structural support to the external walls to eliminate any potential collapsing of the structure due to significant animal pressure being exerted on the walls when the animals are forced into the confined area.

For many various reasons the animals regularly stop "flowing" in the intended direction as described above. Further, they can stop moving all together, and in both scenarios the operator is then required to encourage and, in some instances, force the animals to keep moving in the intended forward direction. This is most often accomplished by the operator entering into the animal zone behind a moveable barrier in the confined circular, semi circular area and then directly pushing the moveable barrier behind the animals and forcing them forwards in the intended direction. In other situations the operator may be required to stand outside the circular, semi-circular area wherein the said moveable barrier is located, and lean over the top perimeter wall of the circular, semi-circular area and manually force the moveable barrier in the intended direction to encourage or force the animals to move in the intended direction. Both these operations are dangerous to the operator as they are required to be situated amongst the animals or lean over the perimeter wall of the circular, semi-circular area and potentially be caught or wedged between the moveable barrier and one of the many supporting struts connected to the perimeter of the circular, semi-circular structure.

If the operator is required to get into the animal zone to force the moveable barrier in the intended direction as described above, such action significantly slows down the desired flowing effect of the animals as the following animals are baulked and stop flowing into the confined circular, semi-circular area upon seeing a person within their immediate environment.

There are alternative systems available that use various types of pneumatic and hydraulic motors to drive the moveable barriers continuously in a 360 degree motion, which can eliminate the need for operators to be physically situated in the animal zone to actuate the moveable barrier. However, these systems are very expensive and are rarely cost efficient for smaller operators.

SUMMARY OF INVENTION

The present invention is directed to an animal enclosure and to a moveable barrier (gate) mechanism for an animal enclosure, which may at least partially overcome at least one of the abovementioned disadvantages, or provide the consumer with a useful or commercial choice.

With the foregoing in view, the present invention in one aspect provides an animal enclosure having a circular, partly circular or semicircular wall or fence, at least one moveable barrier (gate) located within the enclosure, the at least one barrier being rotatable about a vertical axis, and actuation means for causing rotation of at least one of the at least one barrier, the actuation means being operable by an operator, the actuation means including a part or a portion located externally of the enclosure to thereby allow an operator to move the at least one barrier from a location that is external to the enclosure.

In a second aspect, the present invention provides a moveable barrier (gate) mechanism for moving a barrier (gate) within an animal enclosure having a circular, partly circular or semicircular wall or fence, at least one moveable barrier located within the enclosure, the at least one barrier being rotatable about a vertical axis, the moveable barrier mechanism including actuation means for causing rotation of at least one of the at least one barrier, the actuation means being operable by an operator, the actuation means including a part or a portion located externally of the enclosure to thereby allow an operator to move the at least one barrier from a location that is external to the enclosure.

Any suitable type of actuation means may be used. For example, suitable mechanical actuation means include pulleys, chains, belts, drive shafts, gearboxes, levers, pistons, cranks, bellows and pneumatic or fluid power transfer, and dynamo. For example, suitable non-mechanical actuation means include electric motors and gear boxes, as well as hydraulic and pneumatic systems, including using variations of the said mechanical actuation means.

The at least one moveable barrier may be mounted for rotation about a central support member (through which the vertical axis extends) of the animal enclosure. The at least one moveable barrier may be mounted for rotation in any suitable way, such as by way of a sleeve, collar, bearing, housing, wheels, rollers or bracket. The at least one moveable barrier may be of any suitable size, shape and construction.

The at least one moveable barrier may be rotatable through 360 degrees using the actuation means.

In some embodiments, two or more actuation means may be provided. Each of the actuation means may be arranged such that each actuation means can be operated from separate positions located externally of the enclosure.

The actuation means may include at least one handle, grip, pedal, lever, crank or other type of actuator. In one embodiment, the actuation means includes a handle. The handle may be moved or rotated to cause rotation of the at least one barrier. In another embodiment, the actuation means includes a lever. The lever may be actuated to cause rotation of the at least one barrier. The handle or lever may be operatively coupled to the at least one barrier so as to cause rotation of the at least one barrier when the handle or part or portion of the handle located externally of the enclosure is moved through an arc at a fixed radius from the vertical axis.

In some embodiments, the actuation means may include at least one drive system, such as a pulley drive system, a cog drive system, a worm drive system, a rack and pinion gear system, a ratchet system, a wheel drive system, a sprocket or gear system, or a wedge locking or cam locking system. A ratchet system may include a ratchet, such as a ratchet plate or ratchet wheel.

In some embodiments, the actuation means or drive system may include at least one one-way bearing (ie. anti-reverse bearing or sprag). For example, such a bearing may be operatively connected to a handle or other type of actuator as well as to a drive wheel or gear of a cog drive system or sprocket or gear system. In some embodiments, the actuation means or drive system may employ a continuous drive mechanism by employing two one-way bearings arranged in opposite orientation to each other. For example, two such bearings may be operatively connected to a handle or other type of actuator in such a manner that movement of the handle or other type of actuator in both forward and reverse directions causes uninterrupted rotation of the moveable barrier in the forward direction only. In some embodiments, two such bearings may be operatively connected to a handle and further connected to a drive wheel and drive gear of cog drive and sprocket or gear systems, respectively, whereby movement of the handle from a location external of an animal enclosure causes uninterrupted rotation of the barrier.

In some embodiments, the actuation means may include at least one drive system such as a pneumatic or hydraulic drive system including at least one hydraulic or pneumatic cylinder having a piston that is extendable and retractable relative to a cylinder housing so as to cause rotation of the at least one barrier, or it may include a pneumatic rotary air drive component that when connected causes rotation of the at least one barrier.

In some embodiments, the part or portion of the actuation means located externally of the enclosure may be an actuator or part of a drive system or both. In some embodiments, an actuator may be independent of a drive system, or may include one or more components of a drive system/mechanism. The actuator may be located completely or partly externally of the enclosure. The drive system may be located completely or partly within the enclosure. In some embodiments, the actuator and drive system may have one or more shared components.

In some embodiments, the part or portion of the actuation means located externally of the enclosure may be a handle, grip, pedal, lever, crank or other type of actuator that is manually operable and operatively connected to a remainder of the actuation means, such as a drive system.

In some embodiments, the part or portion of the actuation means located externally of the enclosure may include a wireless or hard-wired controller, such as a remote controller, for operating other components of the actuation means, such as an electric, pneumatic or hydraulic drive system. That is, a wireless or hard-wired controller, such as a remote controller, may be an actuator.

In some embodiments, the actuation means may include a handle extending outwardly from a central support member of the enclosure or from a drive system or drive member of the drive system that is mounted to the central support member or other support member of the enclosure (eg. a radial support member/stay of the enclosure). The handle may be located below radial extending portions of radial support members of the enclosure.

In some embodiments, the actuation means may include a drive system operatively connected to (or including) a pedal or lever located external to the enclosure where the pedal or lever is connected to a drive shaft of the drive system and capable of rotating the at least one barrier. The pedal or lever may be situated at ground level together with the drive shaft and the drive shaft may be held relative to a central support member. One end of the drive shaft may be connected to the pedal or lever. The other end of the drive shaft may be operatively connected to the at least one barrier so as to rotate the at least one barrier. This operative connection may include, for example, a further drive shaft, chain, sprocket, pulley, gears, cog, belt, cable or fluid power.

In some embodiments, the actuation means may include a handle, the handle extending outwardly from the central support member of the enclosure or from a drive member mounted to the central support member of the enclosure, the handle being located below the radial extending portions of the radial support members. The drive member may include, or may include part of, a pulley drive system, a cog drive system, a worm drive system, a rack and pinion gear system, a ratchet system, a wheel drive system, a sprocket or gear system, or a wedge locking or cam locking system.

The actuator (lever or handle) located externally to the enclosure may be moved through an arc at a fixed radius from the vertical axis of the central support member or it may be rotated around an alternative horizontal or vertical axis that is mounted external to the enclosure.

In some embodiments, the animal enclosure or barrier mechanism or actuation means may include an engagement means for selectively engaging and disengaging one component of the actuation means from another. For example, this may involve selectively engaging and disengaging the actuator with and from the drive system or component thereof. The engagement means may include a movable engagement member. Any suitable type of engagement means or engagement member may be used. For example an electro magnet that can be connected or disconnected, or a male formation/projection may be made to engage with a female formation. Examples include a pin, rod, roller or tab retainable within a slot or groove or behind a shoulder or recess. For example, the engagement means or engagement member may include a locking pin that may be releasably locked behind a shoulder of a tooth of a ratchet plate or wheel of a ratchet system.

The engagement means or engagement member may be moved by hand or actuated hydraulically, pneumatically or using a motor. For example, the engagement means may include a pneumatic cylinder whereby a piston of the pneumatic cylinder is connected to, for example, a locking pin, that may be extended or retracted relative to a female formation, such as a shoulder of a tooth of a ratchet plate.

The engagement means may include a biasing means, such as a spring, rubber or elastomeric block, for biasing the engagement member into an engaged or disengaged position, depending on the particular embodiment of the invention.

The animal enclosure or moveable barrier mechanism or actuation means may include moveable barrier engagement means that selectively engages with or disengages from the at least one barrier such that when the moveable barrier engagement means is engaged with the at least one barrier, operation of the actuator causes the at least one barrier to rotate, and when the moveable barrier engagement means is disengaged from the at least one barrier, operation of the actuator does not causes the at least one barrier to rotate.

In some embodiments, the at least one moveable barrier may be engaged or disengaged from the actuation means without the need of intervention or separate activation by the operator. That is, the moveable barrier engagement means may operate automatically.

In some embodiments, the barrier engagement means may comprise a moveable barrier engagement member (barrier connector) moveable between an engagement position at which the barrier engagement member engages with the at least one barrier and a disengaged position at which the barrier engagement member is not in contact with the at least one barrier.

In some embodiments, the moveable barrier engagement member may comprise a bar, tongue, tab, rod, pin, cable, wedge assembly, electro magnet, roller, tooth or a cog. In some embodiments, the moveable barrier engagement member may comprise a connecting member that selectively connects to the moveable barrier and selectively disconnects from the moveable barrier.

The barrier engagement means may include a biasing means, such as a spring, rubber or elastomeric block, for biasing the moveable barrier engagement member into an engagement or disengaged position, depending on the particular embodiment of the invention. In some embodiments, the biasing means biases the moveable barrier engagement member into engagement with the movable barrier.

In some embodiments, the moveable barrier engagement means or barrier engagement member may be arranged such that it rotates about the central support member. In some embodiments, the moveable barrier engagement means or barrier engagement member may be arranged such that it rotates with a ratchet plate of a ratchet system.

The animal enclosure or moveable barrier mechanism or actuation means may include a camming member to move the barrier engagement member from the engaged position to the disengaged position. The camming member may be provided in the form of any suitable cam mechanism including but not limited to a roller, follower, plate, wheel, lobe or arm that is fixed securely by suitable means in a suitably relative position such that it is held securely and relative to the desired engagement/disengagement positions. Furthermore, the camming member position may be adjustable to allow for wear and adjustment.

In some embodiments, the camming member may be in the form of a cam plate. The cam plate may be fixed relative to the central support member. The cam plate may extend co-planarly with a ratchet plate of a ratchet system (or other type of plate of a drive system), for rotation relative thereto. As the moveable barrier engagement member rotates about the central support member, part of the moveable barrier engagement member may come into contact with the camming member to cause the moveable barrier engagement member to move from the engaged position to the disengaged position.

As mentioned, the barrier engagement means may include a biasing means to bias the barrier engagement member towards the engagement position. The camming member may operate to move the barrier engagement member against the biasing means to move it out of the engaging position. Further actuation of the actuator may result in the barrier engagement member moving past the camming member such that the biasing means moves the barrier engagement member back to the engagement position.

The moveable barrier mechanism or animal enclosure may include a sensor to determine the position of the at least one barrier to determine the timing and location of the moveable barrier engagement member to be disengaged from the engaged position to the disengaged position and from the disengaged position to the engaged position. The sensor type may be, but not limited to, light, proximity, magnetic, positional, angular, reflective imaging, pressure, volumetric, laser, pulse or rotary encoder.

The moveable barrier mechanism or animal enclosure may include a braking mechanism for preventing the at least one or more barriers from being forced to move in the wrong direction by the animals pressing on the barriers. In some embodiments, a braking mechanism may be fitted to one or more barriers. The braking mechanism may be of conventional design and construction.

In some embodiments, the actuation means includes a ratchet system that allows the at least one barrier to be rotated by operating an actuator located externally to the enclosure. The ratchet system may have a ratchet plate. The ratchet plate may be mounted for rotation about a central support member through which the vertical axis extends.

The actuation means may include an actuator plate mounted for rotation about a central support member. The actuator plate may extend co-planarly with a ratchet plate. The actuator plate may be situated above or below the ratchet plate. An actuator or part of an actuator or drive system, in the form of a handle, pedal, wheel or lever, may be directly or indirectly connected to the actuator plate, so as to rotate the actuator plate when the actuator is operated. When the engagement means selectively engages the actuator with the drive system, the ratchet plate may rotate with the actuator plate. When the engagement means selectively disengages the actuator from the drive system, the ratchet plate may not rotate with the actuator plate.

In some embodiments, the actuation means includes a ratchet system that allows the at least one barrier to be rotated in a first direction by operating an actuator located externally to the enclosure. In some embodiments, the actuator may include a handle or lever, pedal or wheel manually operable and operatively connected to the ratchet system in order to drive the ratchet system. A part or portion of the handle or lever, pedal or wheel may extend externally of the enclosure. A part or portion of the handle or lever, pedal or wheel may extend externally from a central support member of an animal enclosure to a location externally of the enclosure or the actuation means may be situated completely external to the enclosure with no part of the actuation means being within the enclosure. In some embodiments, the actuation means may include a pneumatic or hydraulic drive system operatively connected to the ratchet system in order to drive the ratchet system. In these embodiments, the drive system may include wireless or hard-wired controller, such as a remote controller, located externally of the enclosure and operatively connected to a pneumatic or hydraulic cylinder of the drive system in order to drive the ratchet system. In some embodiments, the pneumatic or hydraulic cylinder may be mounted to a structure of the animal enclosure, such as a central support member of the animal enclosure or a radial support member of the animal enclosure, and a piston of the cylinder may be connected to the ratchet system, for rotation of a ratchet plate of the ratchet system. In some embodiments, the ratchet system may include a lever extending radially from a central support member that is acted upon by the piston so as to convert linear motion of the piston into circular motion of a ratchet plate of the ratchet system.

For one or more of the ratchet system embodiments described herein, a gear tooth plate may be used in place of a ratchet plate. The gear tooth plate may rotate around the vertical axis (eg. central support member), and meshed to the gear tooth plate, on an outer circumference, may be a driver gear. The driver gear may be mounted on a shaft that is mounted to an actuator arm that pivots from the vertical axis and also extends outside the enclosure. The driver gear may be mounted on the shaft via a one-way bearing (ie. allowing rotation in one direction only), and may be connected to an operating handle or driven by an air cylinder. This allows the meshed driver gear to drive the large gear tooth plate when operated in one direction, and when the handle/air cylinder is moved in the opposite direction, the driver gear "free-wheels" in an un-driven state.

In some embodiments, the actuation means includes a wedge locking or cam locking system that allows the at least one barrier to be rotated in a first direction by operating an actuator located externally to the enclosure. In some embodiments, the actuator may include a handle or lever, pedal or wheel manually operable and operatively connected to the wedge locking or cam locking system in order to drive the wedge locking, cam locking system. A part or portion of the handle or lever, pedal or wheel may extend externally of the enclosure. A part or portion of the handle or lever, pedal or wheel may extend externally from a central support member of an animal enclosure to a location externally of the enclosure or the actuation means may be situated completely external to the enclosure with no part of the actuation means being within the enclosure. In some embodiments, the actuation means may include a pneumatic or hydraulic drive system operatively connected to the wedge locking, cam locking system in order to drive the wedge locking, cam locking system. In these embodiments, the drive system may include wireless or hard-wired controller, such as a remote controller, located externally of the enclosure and operatively connected to a pneumatic or hydraulic cylinder of the drive system in order to drive the wedge locking, cam locking system. In some embodiments, the pneumatic or hydraulic cylinder may be mounted to a structure of the animal enclosure, such as a central support member of the animal enclosure or a radial support member of the animal enclosure, and a piston of the cylinder may be connected to the wedge locking, cam locking system, for rotation of a wheel/plate of the wedge locking, cam locking system. In some embodiments, the wedge locking, cam locking system may include a lever extending radially from a central support member that is acted upon by the piston so as to convert linear motion of the piston into circular motion of a wheel/plate of the wedge locking, cam locking system.

In one embodiment, the actuation means includes a ratchet (ratchet plate or wheel), one way bearing, cam locking, or wedge locking system that allows the at least one barrier to be rotated in a first direction by moving an actuator located externally to the enclosure in the first direction, the ratchet, one way bearing, cam locking, or wedge locking system allowing the actuator to move in a second direction opposite to the first direction whilst not causing movement of the at least one barrier in the second direction. The actuator may be a handle or lever.

In one embodiment the actuation means includes a ratchet (ratchet plate or wheel), cam locking, or wedge locking system that allows the at least one barrier to be rotated in a first direction by moving an actuator located externally to the enclosure in the first direction, the ratchet, cam locking, or wedge locking system allowing the actuator to move in a second direction opposite to the first direction causing movement of the at least one barrier to move in the first direction. The actuator may be a handle or lever.

In one embodiment, the actuation means includes a first ratchet (ratchet plate or wheel), cam locking, or wedge locking system (mechanism) that allows the at least one barrier to be rotated in a first direction by moving an actuator located externally to the enclosure in the first direction, the first ratchet, cam locking, or wedge locking system allowing the actuator to move in a second direction opposite to the first direction whilst not causing movement of the at least one barrier in the second direction, and a second ratchet, cam locking, or wedge locking system (mechanism) that allows the at least one barrier to be rotated in the second direction by moving an actuator located externally to the enclosure in the second direction, the second ratchet, cam locking, or wedge locking system allowing the actuator to move in the first direction whilst not causing movement of the at least one barrier in the first direction. In this embodiment, the first ratchet, cam locking, or wedge locking system can be selectively engaged from a position located externally to the enclosure to cause movement of the at least one barrier in the first direction. The second ratchet, cam locking, or wedge locking system can be selectively engaged from a position located externally to the enclosure to cause movement of the at least one barrier in the second direction. In this embodiment, the actuation means may also include a first engagement means for selectively engaging and disengaging the actuator with a ratchet, cam locking, or wedge locking plate/wheel of the first ratchet, cam locking, or wedge locking system and a second engaging means for selectively engaging and disengaging the actuator with a ratchet, cam locking, or wedge locking plate/wheel of the second ratchet, cam locking, or wedge locking system.

In desirable embodiments, the at least one barrier is mounted for rotation about a central support member. The central support member is typically a vertical member or post located at the centre of the circular, partly circular or semicircular enclosure. The central support member may rest on the ground (for example, it may be provided with a bottom plate that rests on the ground), or it may be buried into the ground, or concreted into the ground, or bolted securely to concrete that is at ground level.

The animal enclosure may be of any suitable construction. Suitable animal enclosures may include features as described in the background section as well as elsewhere in this specification.

In some embodiments, the animal enclosure includes a single moveable barrier (gate). In other embodiments, the animal enclosure includes two or more moveable barriers (gates).

In one embodiment, the enclosure comprises two moveable barriers. Each barrier may be moveable separately or independently of the other barrier. Each barrier may be moveable by operation of a single actuation means. Alternatively, each barrier may be moveable by operation of separate actuation means.

In embodiments where the animal enclosure includes two or more moveable barriers, more than one actuation means may be provided. For example, a first actuation means may be provided such that the first actuation means can be operated from a point or small region external to the enclosure and a second actuation means may be provided such that the second actuation means can be operated from a separate, spaced point or small region external to the enclosure.

In one embodiment, the animal enclosure includes a central support member and a plurality of radial support members extending from the central support member to the circular, partly circular or semicircular external wall or fence, adjacent ones of the plurality of radial support members forming an angle to each other such that outer ends of the adjacent ones of the radial support members are spaced from each other, and wherein the actuation means is arranged such that an operator may remain within a space subtended by adjacent ones of the radial support members and external to the enclosure during operation of the actuation means to cause rotation of the at least one barrier.

In one embodiment, the enclosure comprises two moveable barriers comprising a first barrier and a second barrier each mounted for rotation about a central support member. The actuation means includes an actuator having an outer end that is located externally to the enclosure. A ratchet, cam locking, or wedge locking plate (wheel) or sprocket is mounted for rotation relative to the central support member. The actuator engages with the ratchet, cam locking, or wedge locking plate or sprocket such that rotation of the actuator in a first direction causes the ratchet, cam locking, or wedge locking plate or sprocket to rotate in a first direction, whilst rotation of the actuator in a second direction that is opposite to the first direction does not cause rotation of the ratchet, cam locking, or wedge locking plate or sprocket. A moveable barrier engagement means is provided to selectively engage with or disengage with the first barrier or the second barrier such that when the moveable barrier engagement means is engaged with the first moveable barrier, operation of the actuator in the first direction causes the first moveable barrier to rotate in the first direction and when the moveable barrier engagement means is engaged with the second barrier, operation of the actuator in the first direction causes the second barrier to rotate in the first direction. The moveable barrier engagement means may be arranged such that it rotates with the ratchet, cam locking, or wedge locking plate or sprocket.

The moveable barrier engagement means may comprise a moveable barrier engagement member that can be moved between an engagement position at which the moveable barrier engagement member engages with a barrier and a disengaged position at which the moveable barrier engagement member is not in contact with the barrier. When the moveable barrier engagement member is in the disengaged position, movement of the actuator in the first direction can cause the moveable barrier engagement member to move away from the barrier. The moveable barrier engagement member can then be moved to the engaged position such that the moveable barrier engagement member can come into engagement with the other moveable barrier to thereby enable movement of the other moveable barrier to occur.

In one embodiment, a camming member is provided to move the moveable barrier engagement member from the engaged position to the disengaged position. The moveable barrier engagement means may include a biasing means to bias the moveable barrier engagement member towards the engagement position and the camming member may operate to move the moveable barrier engagement member against the biasing means to move it out of the engaging position. Further activation of the actuator in the first direction may result in the moveable barrier engaging member moving past the camming member such that the biasing means moves the moveable barrier engagement member back to the engagement position.

The animal enclosure or moveable barrier mechanism can include locking means for locking the at least one barrier or otherwise holding the at least one barrier fast relative to the animal enclosure, and these include the following: drop down latch, or catch, slide in/out bar or pin, over-centre lock, rotational lock, friction/wedge lock, geared lock, tab, teeth, or combinations of any of these. The at least one barrier may be locked in the desired position to a structure of the animal enclosure frame (eg. peripheral wall, radial support member or door). Alternatively, the least one barrier may be locked at various positions wherein the actuation means may release the barrier as the barrier rotates. Triggers that could manually or automatically release the barrier include: cables, levers, cams or rod/pins; rotational locks using geared drive shafts, pulleys or cranks; or geared locks (could require power input into gears, e.g. worm drive). Triggers that could automatically release the at least one barrier could include attachment on a second moveable barrier as it comes close to the first moveable barrier, attachment on the outside frame of the animal enclosure that is triggered when the other barrier comes into position; or a mechanism associated with the central support member that triggers when the other barrier comes into position.

In a preferred embodiment the animal enclosure includes:

a circular or semicircular circumferential wall having one or more openings for animals;

a central support member located near a centre of the circumferential wall;

one or more moveable barriers mounted to the central support member and rotatable relative to the central support member;

actuation means including an actuator operatively connected to a drive system for rotating one or more of the barriers about the central support member, wherein the actuator is located partly or completely externally of the circumferential wall, and wherein the drive system is mounted relative to the central support member and can rotate one or more of the barriers when actuated;

engagement means for selectively engaging and disengaging the actuator with and from the drive system; and moveable barrier engagement means for selectively engaging with or disengaging from the at least one barrier, wherein when the moveable barrier engagement means is engaged with the least one barrier, operation of the actuator causes the at least one barrier to rotate, and when the moveable barrier engagement means is disengaged from the at least one barrier, operation of the actuator does not cause the at least one barrier to rotate.

Features of this preferred embodiment may be as described above.

The moveable barrier mechanism in accordance with the second aspect of the present invention may include the features of the actuation means or animal enclosure as described above or further below.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which.

DESCRIPTION OF EMBODIMENTS

Figure 1:
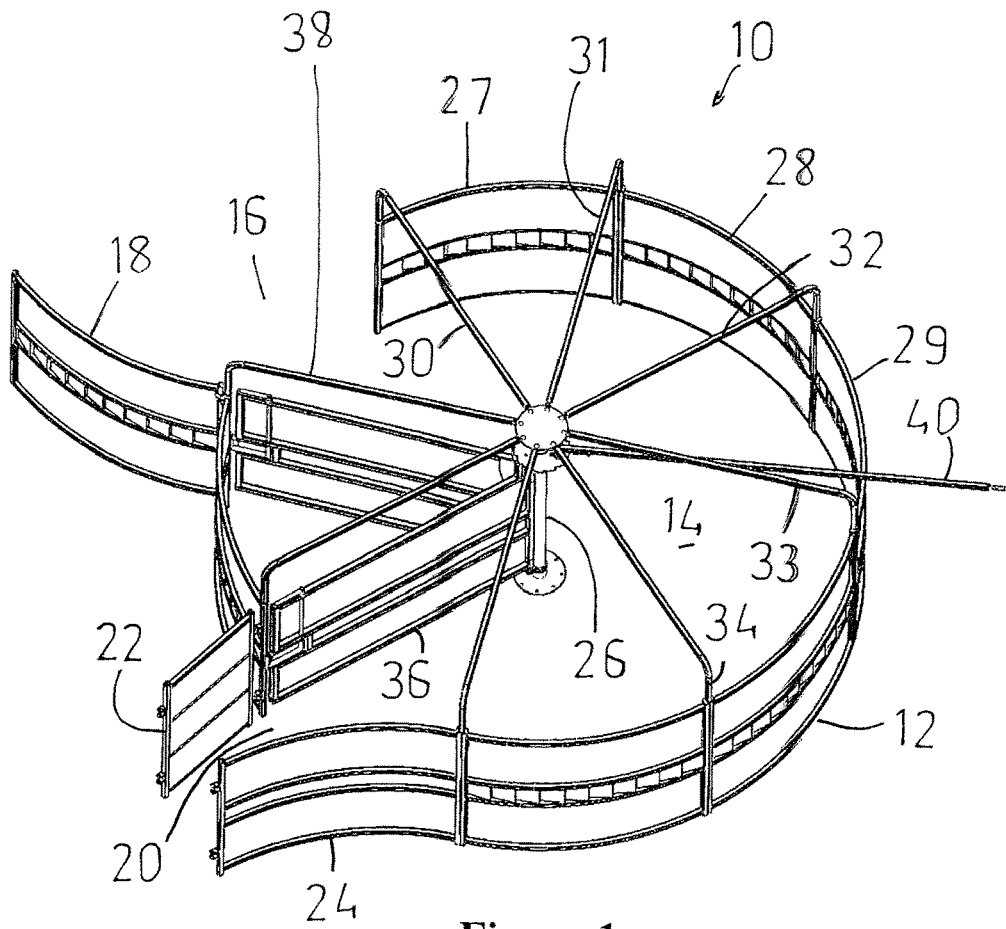
FIG. 1 shows a perspective view of an animal enclosure having barriers and a barrier mechanism, including actuation means for causing rotation of the barriers, in accordance with an embodiment of the present invention.

It will be appreciated that the drawings have been provided for the purposes of illustrating preferred embodiments of the present invention. Therefore, it will be understood that the present invention should not be considered to be limited to the features as shown in the drawings.

The animal enclosure 10 shown in FIG. 1 is used as a force tub or crowd tub. As can be seen from FIG. 1 the enclosure 10 has an external wall, generally denoted at 12, that is in the form of a circular wall or circular fence. The circular wall encircles an internal space 14 in the enclosure. The enclosure 10 includes an entry opening 16 that can be closed by an external barrier 18 and an exit opening 20. External barriers 22, 24 may be used to close the exit opening 20. The enclosure 10 includes a central support post 26.

The generally circular external wall 12 is made from a number of arcuate fence or wall sections, some of which are numbered at 27, 28 and 29 in FIG. 1. These fence sections will be well understood by a person skilled in the art and need not be described in greater detail. The fence sections 27, 28, 29 are connected together using appropriate means which may include connectors, fasteners or welded to form the generally circular wall 12 of the enclosure 10. In order to provide additional strength to the generally circular wall 12 of the enclosure 10, a number of radial support struts, some of which are numbered at 30, 31, 32, 33, are connected at their inner ends to the central support post 26. At their outer ends, the radial support struts include a downwardly extended part 34 that is connected to the external wall 12 of the enclosure 10. In this manner, the external wall 12 is supported and strengthened.

The construction of the animal enclosure 10 as described above is essentially conventional and will be well understood by persons skilled in the art. In particular, the skilled person will appreciate that such confined enclosures are regularly constructed of materials strong enough to withstand the forces exerted on them by the animals when they are crowded and confined into the internal space of the enclosure. Such structures typically have curved internally clad walls to prevent the animals from being distracted by movement outside the enclosed area or provide the animals with what they may consider as other potential paths of travel. The walls and barriers are constructed to a suitable height to safely contain the animals and prevent them from jumping over the walls of the structure. The radial support struts 30, 31, 32, 33 extend horizontally from the central post 26 at a height that is well above the animals. Such struts 30-33 connect at regular intervals around the exterior walls that define the outer circumference of the confined enclosure to provide structural support to the external walls to eliminate any potential collapsing of the structure due to the significant pressure being exerted by animals on the walls with the animals are forced into the confined area.

The enclosure 10 is also provided with two internal barriers (also known as "gates") comprising a first barrier 36 and a second barrier 38. In the positions shown in FIG. 1, the first barrier 36 is used to direct animals out through the exit opening 20. The second barrier 38 is used to ensure that the animals entering through the entry opening 16 walk through the internal space 14 of the enclosure 10 in the correct direction. This assists in facilitating a regular flow of animals through the enclosure. The first barrier 36 and the second barrier 38 are arranged such that they rotate around the central support member/post 26.

In installations such as those shown in FIG. 1, the first barrier moves past the furtherest point of the exit opening once all the animals have exited the confined area, the second barrier then begins to move in the same direction and following the same path as the first barrier. The first barrier is then moved into the original position of the second barrier, blocking off access to the exit portion for the incoming animals. The second barrier continues to move in a circular motion to follow the path of the first barrier. This sequence is intended to be a largely continuous action allowing separate segregated groups of animals to enter, move around the confined internal space of the enclosure and exit into another section of the main holding yards.

In practice, it is common for the animals to stop moving in the intended direction or the animals can stop moving altogether. In either case, the operator is then required to force the animals to keep moving in the intended forward direction. At present, this is typically accomplished by the operator either entering into the internal space 14 of the enclosure with the animals and moving in behind the animals already secured by the barrier and then directly pushing the barrier behind the animals and forcing them forwards in the intended direction. In other installations, the operator may be required to lean over the top of the perimeter wall and manually force the barrier in the intended direction. Both these operations are dangerous to the operator as they are required to either move amongst the animals or lean over the perimeter wall and potentially be caught or wedged between the barrier and one of the supporting struts of the enclosure. Further, if the operator is required to get in amongst the animals to force the barrier in the desired direction, this action can significantly slow down the desired flowing effect of the animals as the animals often become baulked and stop flowing into the confined area by seeing a person within their movement zone.

The present invention allows an operator to move the internal barriers 36, 38 from a position located external to the enclosure 10 using actuation means. The actuation means includes an actuator operatively coupled to a drive system. Further, the present invention also allows the operator to remain in a relatively fixed position whilst moving the barriers using the actuation means. In the embodiment shown in FIG. 1, a handle/operable lever 40 is provided. The handle 40 forms part of the actuator of the actuation means, for actuating in moving the first barrier 36 and the second barrier 38. In the embodiment shown in FIG. 1, the handle 40 can cause the internal barriers 36, 38 to effectively fully rotate within the enclosure whilst only requiring the handle 40 to move in an arc that is positioned between the radial strut 32 and the radial strut 33.

Details of the drive system of the actuation means (actuating mechanism) that will enable the internal barriers 36, 38 to rotate around the generally circular enclosure whilst being operated by an operator located external to the enclosure will be described in more detail with reference to the similar ratchet drive system shown in FIGS. 4 to 13.

Figure 2:
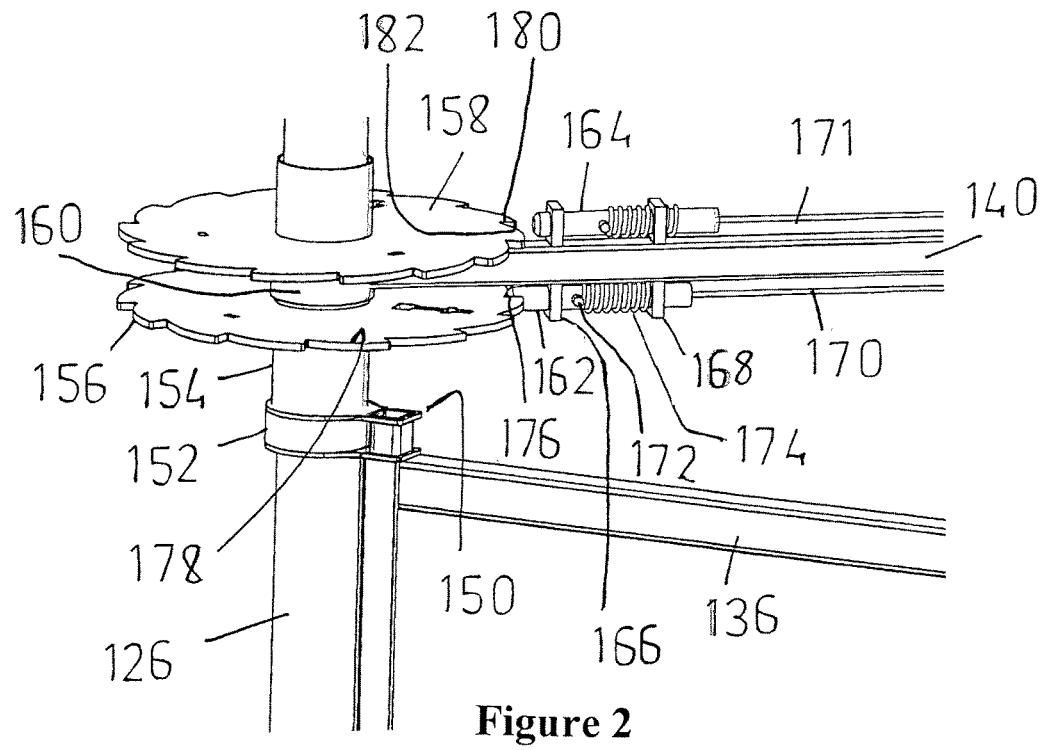
FIG. 2 shows a perspective view of one embodiment of a barrier mechanism including actuation means for causing rotation of a barrier in an animal enclosure, in accordance with an embodiment of the present invention.

In some embodiments of the present invention, the enclosure may comprise a semicircular enclosure. Again, such semicircular enclosures are well known to persons skilled in the art. Semicircular enclosures are frequently only provided with a single internal pivoting barrier. In these embodiments, the barrier is first moved so that it lies just "upstream" of the entry opening to the enclosure. When the enclosure is filled with animals, the barrier is moved to help force the animals through the enclosure and out of the enclosure. Once the animals have left the enclosure, the barrier is swung back the other way to its original position, ready to admit further animals to the enclosure. Thus, in embodiments where a single barrier is utilised in a semicircular enclosure, it is necessary that the barrier can be rotated in both a clockwise and anticlockwise direction. One mechanism that will enable this to occur whilst allowing an operator to manually move the barrier from a position located external to the enclosure and from a largely fixed position external to the enclosure is shown in FIG. 2. In FIG. 2, components that are similar to those shown in FIG. 1 are denoted by a similar reference, but with a "1" added to the front. For example, the central support post 126 shown in FIG. 2 corresponds to the central support post 26 shown in FIG. 1.

As can be seen from FIG. 2, the single barrier 136 is mounted so that it can rotate around the central support member/post 126. The barrier 136 is mounted to a bracket 150 that is connected to a collar 152 that is rotatably mounted to the central support post 126. The collar 152 forms a lower part of a sleeve 154 that is also rotatably mounted to the support post 126. The sleeve 154 carries a first ratchet wheel/plate 156 and a second ratchet wheel/plate 158 of the drive system of the actuation means. As can be seen from FIG. 2, the first ratchet wheel 156 is of opposite orientation to the second ratchet wheel 158. A handle 140 is mounted to a further collar 160. Further, collar 160 extends around the portion of sleeve 154 that is located between first ratchet wheel 156 and second ratchet wheel 158.

The enclosure/moveable barrier mechanism includes engagement means for selectively engaging and disengaging the actuator with and from the drive system. The handle 140 carries a first pin 162 and a second pin 164. In order to mount first pin 162 to the handle 140, a first ear 166 and a second ear 168 are mounted to the handle, such as by welding. The first ear 166 and the second ear 168 have aligned openings through which the pin 162 can pass. A rod 170 extends from the first pin 162 along the underside of the handle 140. The outer end of the rod 170 can be actuated by an operator standing at or near the outer end of the handle 140. The first pin 162 is provided with a stop member 172.

A biasing spring 174 biases the first pin 162 towards the first ratchet wheel 156. The second pin 164 is arranged in a similar manner.

The rod 170 may be retracted by the operator in order to withdraw the pin 162 away from the first ratchet wheel 156. The rod 170 may be provided with a retainer to retain the rod in the retracted position. The retainer may be as simple as a stop member mounted to or near an outer end of the handle 140, which stop member can interact with a projection on the outer end of the rod 170. Alternatively, a pushbutton locking mechanism (sprung latch) may be used. Other locking mechanisms may also be used in the present invention to keep the pin in a retracted position.

In the embodiment shown in FIG. 2, the second pin 164 is shown retracted from the second ratchet wheel 158. The first pin 162 is shown engaged with the first ratchet wheel 156. When handle 140 is moved/rotated in a clockwise direction, the first pin 162 engages with a shoulder 176 on the periphery of the first ratchet wheel 156. This prevents relative movement between the first pin 162 and the first ratchet wheel 156. As a result, the first ratchet wheel 156 moves in a clockwise direction, which also causes the barrier 136 to rotate in a clockwise direction. When the handle 140 is moved in a counter-clockwise direction, the first pin 162 slides up over a ramp 178 on the periphery of the first ratchet wheel 156. This causes the first pin 162 to ride up and retract over the ramp 178. In this regard, the first ratchet pin 162 is forced to move over the ramp 178 against the biasing force of spring 174. As soon as the handle 140 has turned sufficiently to move the first pin 162 past the rear shoulder of the ramp 178, the pin 162 snaps back against the next rear shoulder 176. The handle 140 can then be moved in a clockwise direction to again turn the barrier 136 in a clockwise direction.

When it is desired to turn the barrier in a counter-clockwise direction, the rod 170 is actuated to retract the first pin 162 from the first ratchet wheel 156. At the same time, rod 171 that is associated with second pin 164 is actuated to extend the second pin 164 so that it comes into engagement with the periphery of the second ratchet wheel 158. Rotating the handle 140 in a counter-clockwise direction causes the second pin 164 to engage with shoulder 180 on the second ratchet wheel 158. Moving/rotating the handle 140 in a clockwise direction causes the second pin 164 to ride up over ramp 182 on second ratchet wheel 158 until the second pin 164 rides over the rear shoulder of ramp 182 and snaps back into place behind that shoulder. The handle 140 may then be moved in a counter-clockwise direction to cause further movement of the barrier in the counter-clockwise direction.

It will be appreciated that in the position shown in FIG. 2, the barrier 136 can be moved in a clockwise direction by a series of movements comprising a short movement of the handle 140 in a clockwise direction, followed by a short movement of the handle in a counter-clockwise direction, followed by a short movement of the handle in a clockwise direction, and so forth. In this manner, an operator located externally of the enclosure 10 can stand in any essentially fixed position and operate the handle from the external fixed position to cause the barrier 136 to rotate. The full range of desired rotation of the barrier 136 can be achieved without requiring the operator to change positions to any great extent. Further, the operator does not need to manipulate the handle past the radial support struts, thereby enhancing the efficiency and safety of the device. The handle 140 is suitably positioned at a height that is above the height of the animals moving through the enclosure 110. This assists in avoiding damage to the handle and also minimising the likelihood of the animals being baulked or spooked by the handle.

Figure 3:
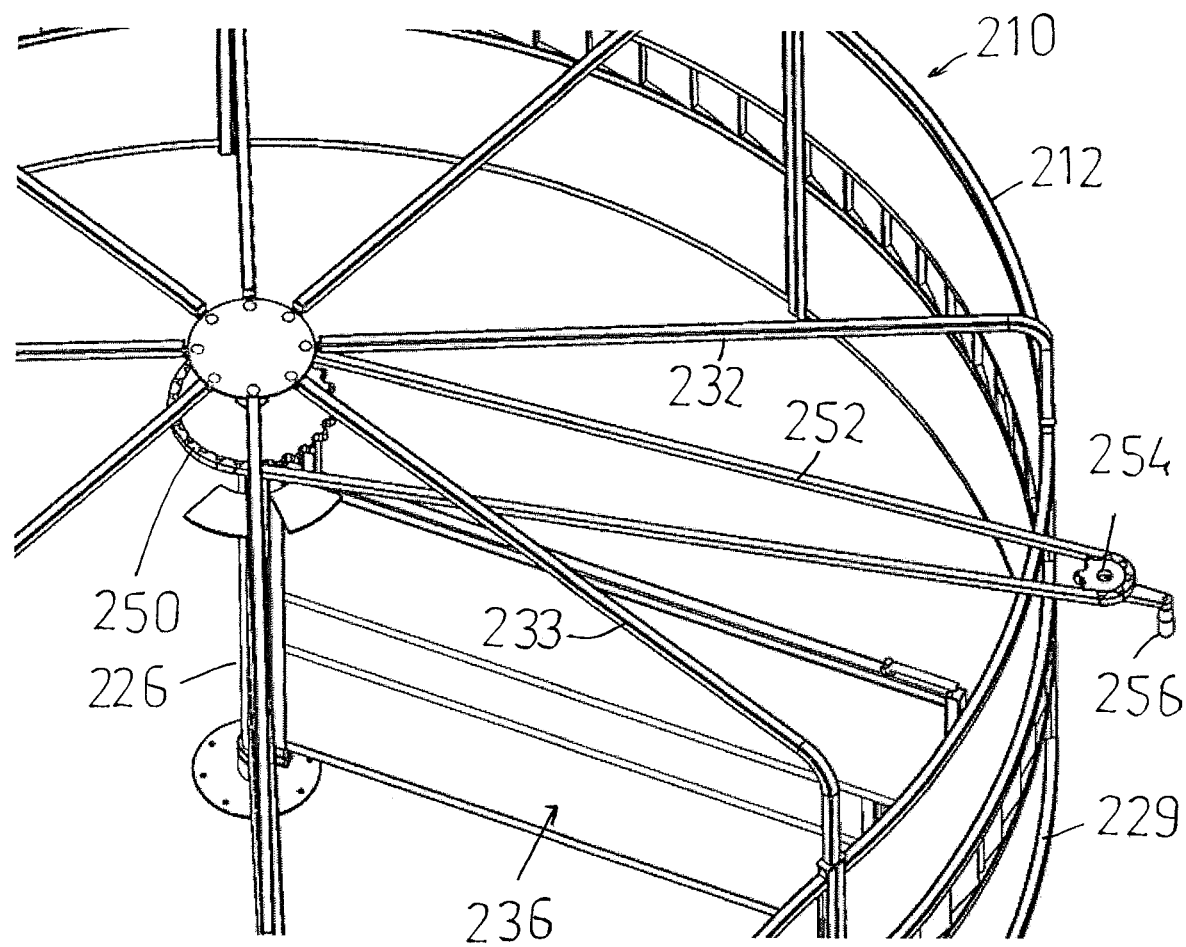
FIG. 3 shows a perspective view of another embodiment of a barrier mechanism including actuation means for causing rotation of a barrier in an animal enclosure, in accordance with an embodiment of the present invention.
Figure 4:
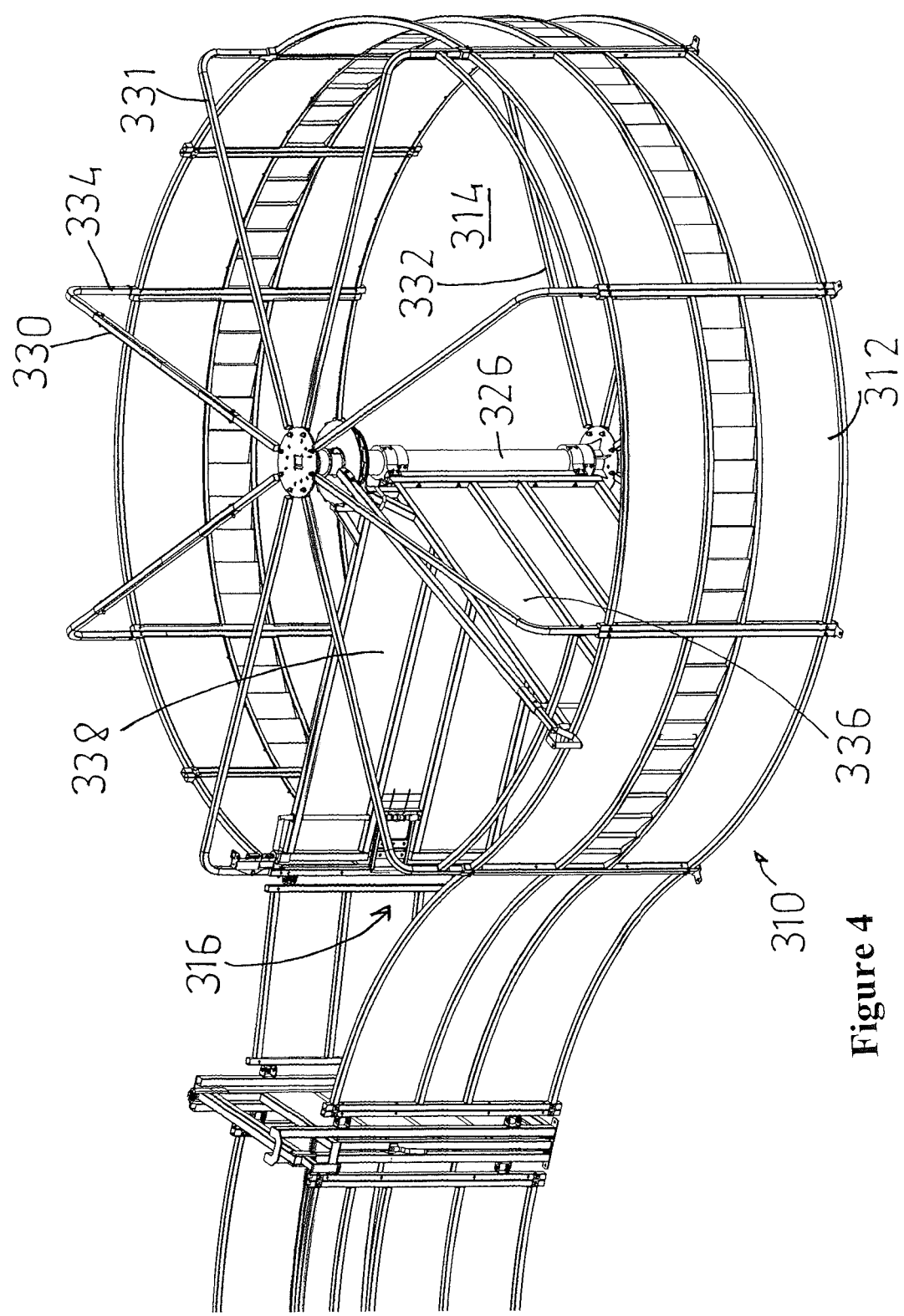
FIG. 4 shows a perspective view of an animal enclosure having barriers and a barrier mechanism, including actuation means for causing rotation of the barriers, in accordance with an embodiment of the present invention.

FIG. 3 shows a perspective view of another embodiment of the present invention. In the embodiment shown in FIG. 3, features that are common to the features shown in FIG. 1 are denoted by the same reference but with a "2" added to the front. For example, the central support member/post 226 shown in FIG. 3 corresponds to the central support post 26 shown in FIG. 1.

In the embodiment shown in FIG. 3, the barrier 236 is mounted to the support post 226 so the barrier 236 can rotate about the support post 226. The actuation means include a toothed wheel 250 mounted on the support post 226 so that it can rotate about the support post 226. A sleeve, which is hidden in FIG. 3, extends downwardly from the tooth wheel 250 and the barrier 236 is connected to the sleeve. A chain or drive belt 252, in the form of an endless chain or belt, extends around the toothed wheel 250. A drive wheel 254 is mounted for rotation relative to the outer wall of the enclosure 210 by mounting struts (not shown for clarity). The chain or drive belt 252 also extends around the drive wheel 254. A handle/crank 256 actuator is mounted to the drive wheel 254.

In order to rotate the barrier 236, an operator moves the handle 256 which causes the drive wheel 254 to turn which, in turn, drives the chain or drive belt 252 to cause rotation of the toothed wheel 250. This causes rotation of the barrier 236. The barrier can be moved in a clockwise direction and a counter-clockwise direction by simply changing the direction of rotation of the handle 256. Again, the operator is positioned externally of the enclosure 210 and the operator can remain in an essentially fixed position whilst rotating the barrier 236. The chain or drive belt 252 is suitably positioned at a height that is above a height of the animals passing through the enclosure 210.

Another type of animal enclosure 310/moveable barrier mechanism is shown in FIGS. 4 to 11. In these drawings, the features that are in common with the features shown in FIG. 1 will be denoted by a similar reference numeral but with a "3" added to the front.

The enclosure 310 has an external wall, generally denoted at 312, that is in the form of a circular wall or circular fence. The circular wall encircles an internal space 314 in the enclosure. The enclosure 310 includes an opening 316 that can serve both as an entry and exit. The enclosure 310 includes a central support post 326.

As described for enclosure 10, enclosure 310 has a number of radial support struts (some of which are numbered at 330, 331) that are connected at their inner ends to the central support post 326. At their outer ends, the radial support struts include a downwardly extended part 334 that is connected to the external wall 312 of the enclosure 310. The enclosure 310 includes additional radial support struts (one of which is numbered at 332) extending from the central support member/post 326 to the external wall 312 at ground level. In this manner, the external wall 312 is supported and strengthened.

Figure 5:
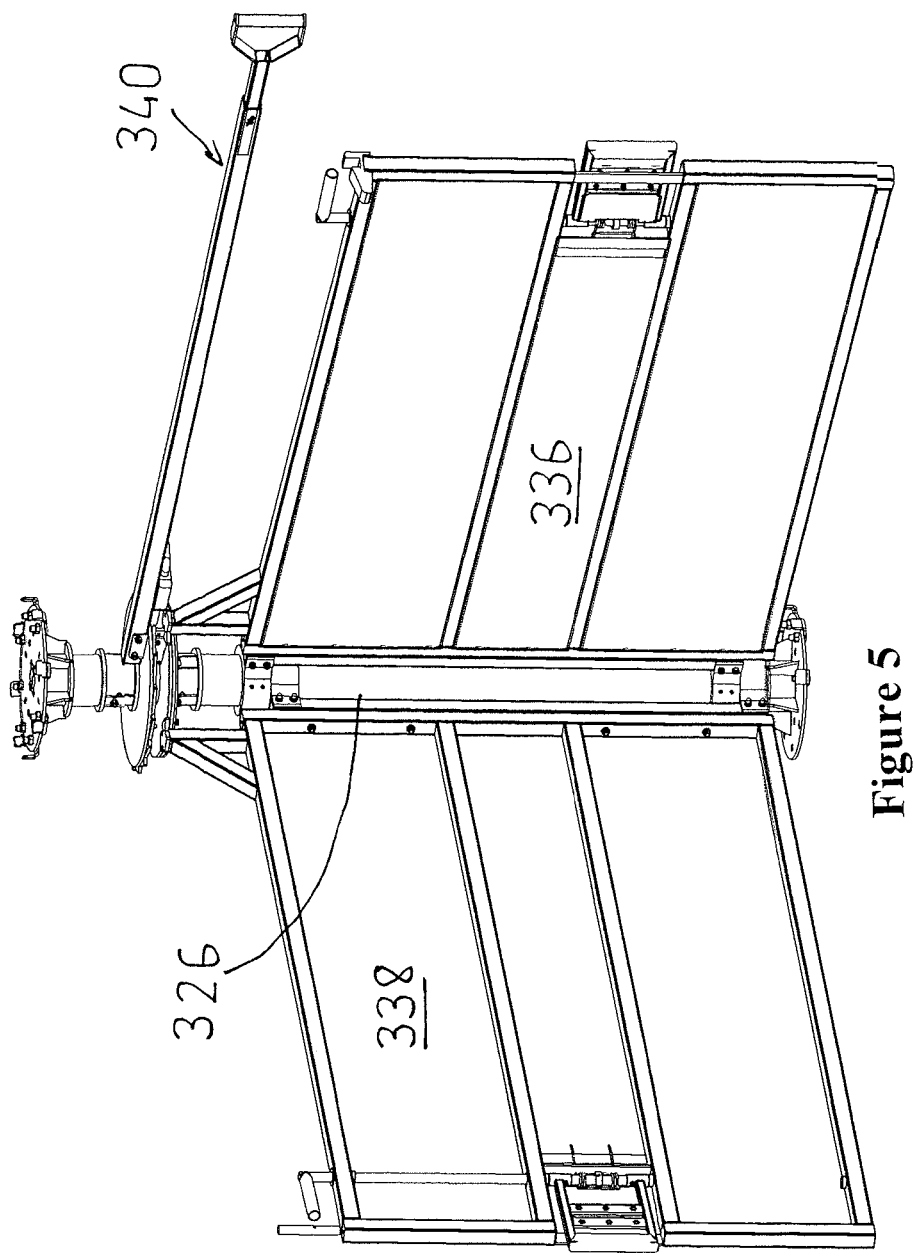
FIG. 5 shows a perspective view of some of the animal enclosure of FIG. 4, but mostly the actuation means and barriers.

The enclosure 310 is also provided with two internal barriers (gates) comprising a first barrier 336 and a second barrier 338. This is best seen in FIG. 5. The first barrier 336 and the second barrier 338 are arranged such that they rotate around the central support post 326.

FIGS. 5 to 13 show various views of a barrier mechanism having actuation means that can be used to move internal barriers 336 and 338. The central support post 326 has a ratchet wheel 350 rotatably mounted thereto. The ratchet wheel 350 is most clearly shown in FIG. 9 where it can be seen that the ratchet wheel 350 has a periphery that includes a series of shoulders 352 that are separated by ramps 354. The ratchet wheel 350 includes a central opening 356 to allow the ratchet wheel 350 to be fitted over the central support post 326. The ratchet wheel 350 also includes a radial slot 358 situated above a barrier connector 370.

Figure 7:
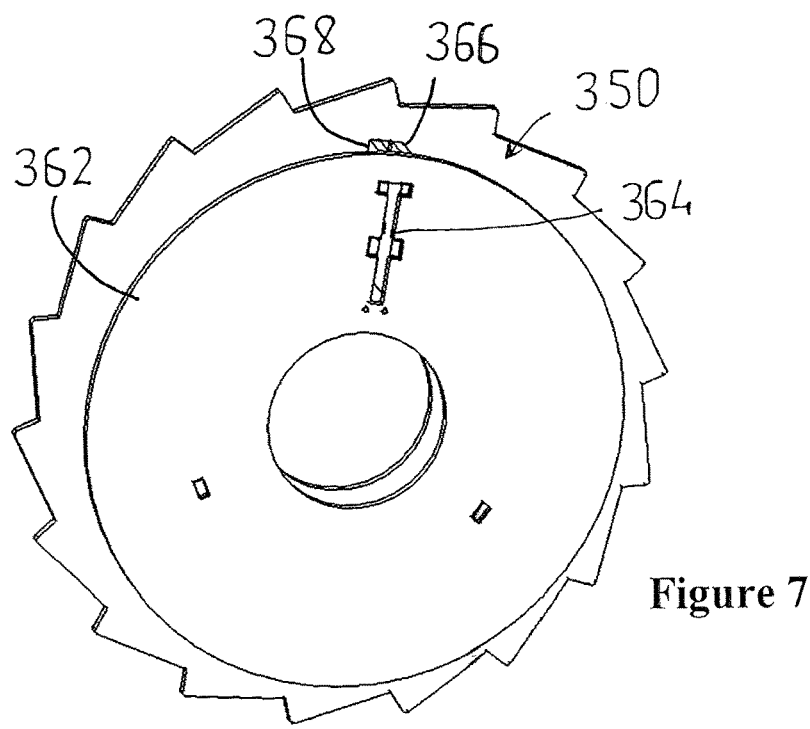
FIG. 7 shows an underneath view of a ratchet wheel of the actuation means shown in FIG. 6.

As best shown in FIG. 7 the ratchet wheel 350 is connected (such as by welding) via an intermediate sleeve 360 to a circular plate 362. Circular plate 362 includes a radial guide slot 364 (which partly receives the barrier connector 370). Both ratchet wheel 350 and circular plate 362 rotate together by virtue of them being connected together.

Figure 8:
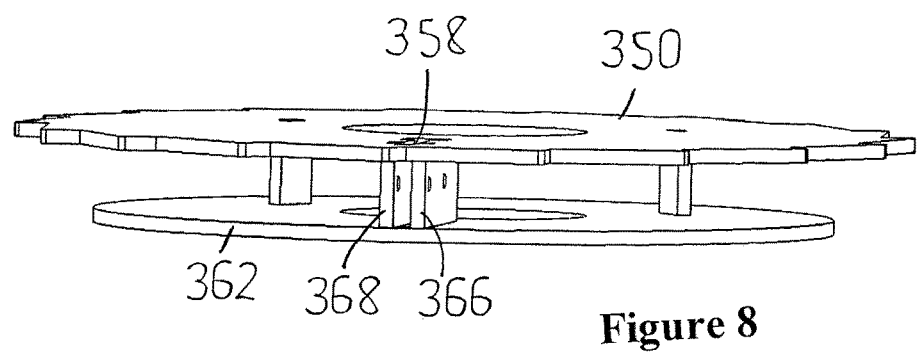
FIG. 8 shows a side view of the ratchet wheel shown in FIG. 7.
Figure 9:
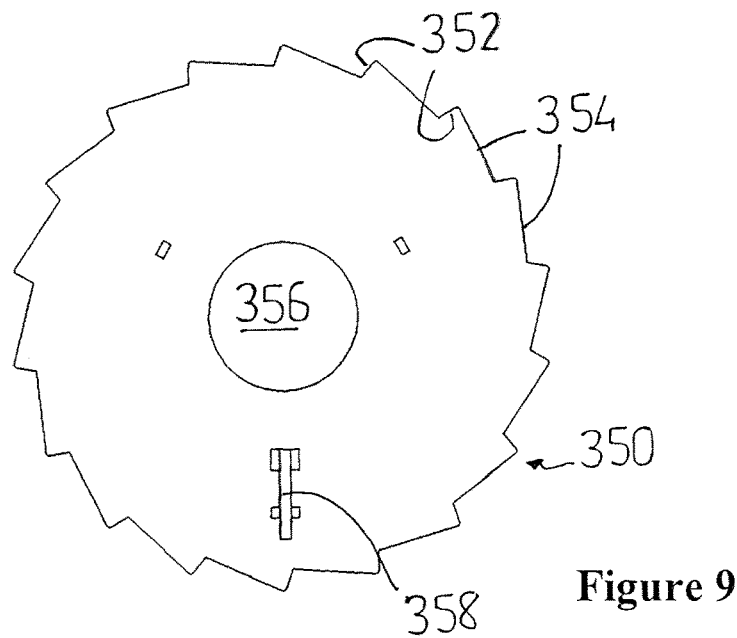
FIG. 9 shows a top view of the ratchet wheel shown in FIG. 7.

The ratchet wheel 350 is fitted on its underside with two spaced ears 366, 368 (best shown in FIG. 8). Ears 366, 368 may be welded to the underside of the ratchet wheel 350. The ears are used to slidably mount the barrier connector 370. The barrier connector 370 forms the barrier engagement means of the barrier mechanism. The barrier connector 370 can be seen more clearly in FIG. 11. In particular, the barrier connector 370 is in the form of a bar that is provided with elongated slots 371, 372. Bolts extend through openings in the ears 366, 368. These bolts also extend through the elongated slots 371, 372. This allows the barrier connector 370 to slide inwardly and outwardly in a radial direction until the bolts come into contact with the respective ends of the slots 370, 371. The barrier connector 370 is also provided with a lower edge that includes a vertically extending shoulder 374. Shoulder 374 engages with a camming means to cause the barrier connector 370 to be retracted. A biasing means, such as a compression spring or a tension spring or a rubber block or an elastomeric block (shown in FIG. 13 at 381 as a compression spring), is used to bias the barrier connector 370 to an outwardly extending position.

Figure 11:
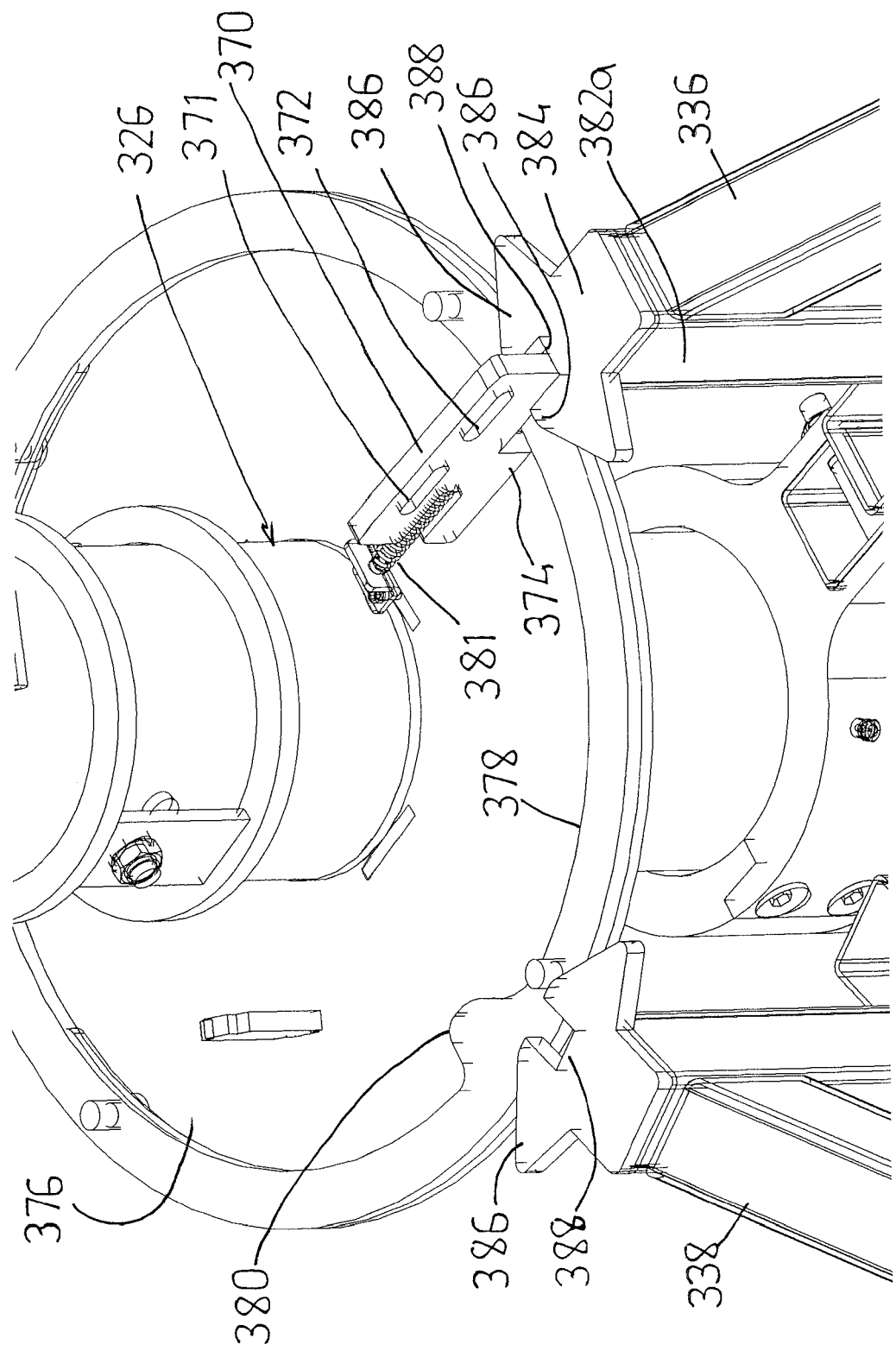
FIG. 11 shows a perspective view like that in FIG. 6 but with detail removed to show more clearly a barrier connector and a camming wheel of the barrier mechanism.

The enclosure/barrier mechanism is also provided with a cam plate 376, as best seen in FIG. 11. Cam plate 376 is mounted in fixed position to the central support post 326. The cam plate 376 includes an internal shoulder 378 that is formed by either raising a lip around the periphery of the cam plate 376 or by recessing a central portion of the cam plate 376. Shoulder 378 includes a camming surface 380. As the first barrier 336 is rotated, the barrier connector 370 is moved to a position where the shoulder 374 contacts the camming surface 380. This causes the barrier connector 370 to retract such that it moves out of engagement with the first barrier 336. Further rotation of the ratchet wheel 350 causes the barrier connector 370 to remain retracted and rotate past the first barrier 336. When the barrier connector 370 is rotated to a position that is past the camming surface 380, the barrier connector 370 extends back outwardly by way of the force of the compression spring 381. However, at this position, it has now cleared the first barrier 336 and therefore is no longer in contact with or engagement with the first barrier 336.

Figure 6:
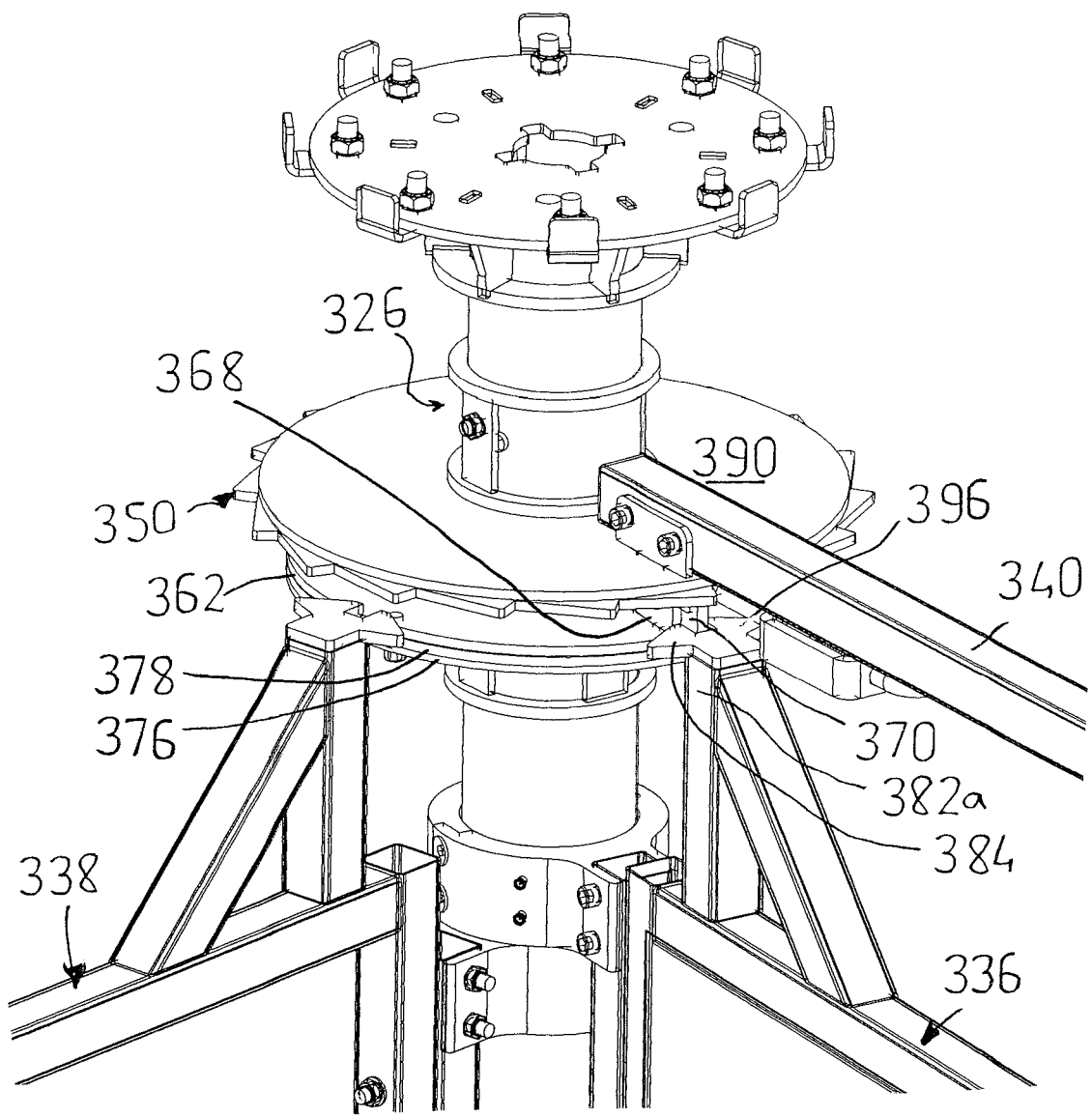
FIG. 6 is a close-up view of that shown in FIG. 5.
Figure 10:
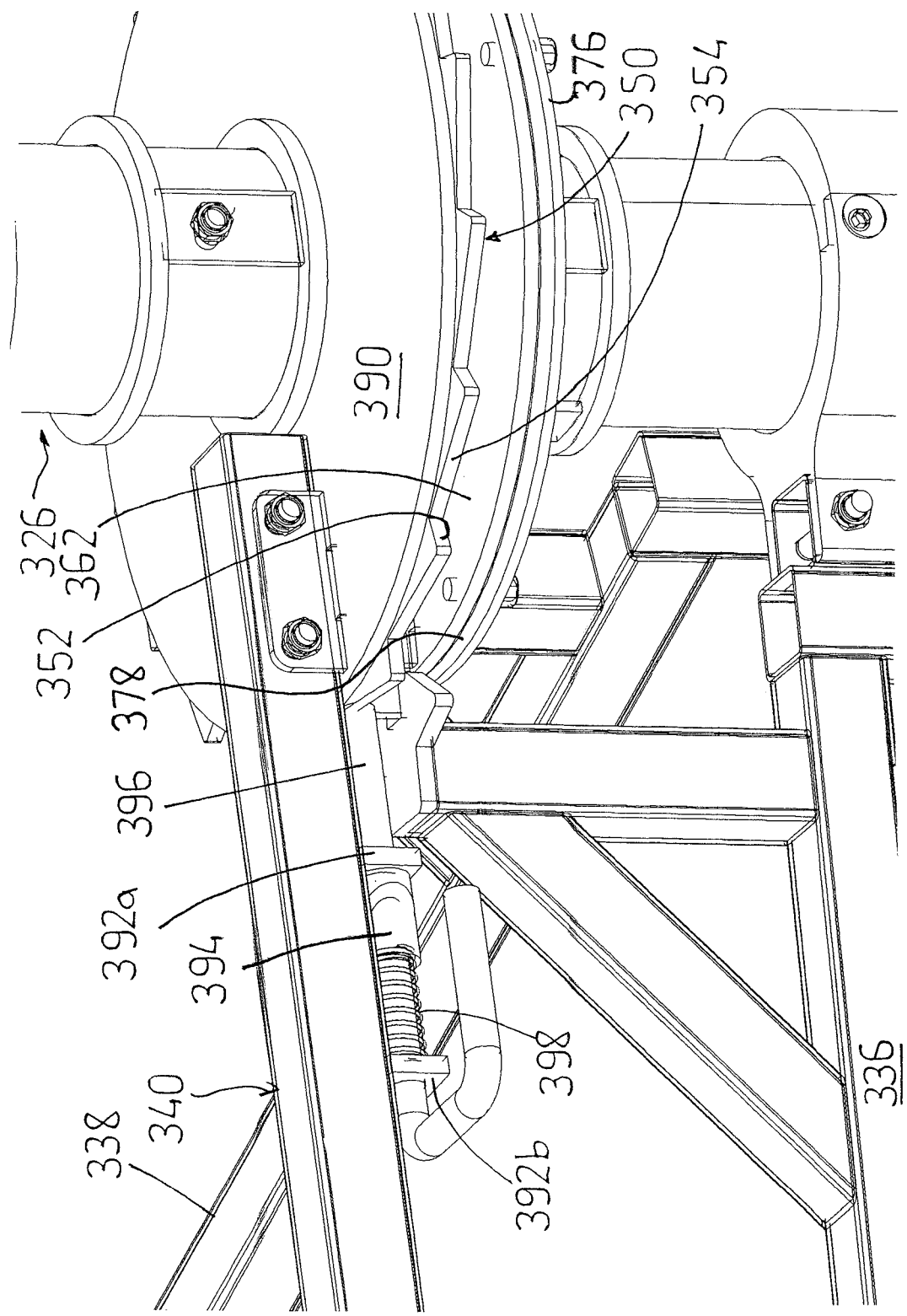
FIG. 10 shows a perspective view showing a handle engaging with the ratchet wheel of the actuation means (as well as other parts)

The first barrier 336 is provided with a vertical member 382a. The vertical member 382a may itself comprise an engagement surface that comes into contact with the barrier connector 370. Alternatively, the vertical member 382a may be provided with a retainer 384 for retaining the barrier connector 370. The retainer 384 is best shown in FIGS. 6, 10 and 11. The retainer 384 may be in the form of a plate having an inner edge that has first and second ramped regions 386 and a slot 388 there between. The slot 388 may comprise an open-ended slot. The barrier connector 370 comes into contact with a leading ramped region 386. As the barrier connector 370 is rotated, it moves along a ramped region 386, which causes the barrier connector 370 to retract inwardly. Once the barrier connector 370 comes into alignment with the open-ended slot 388, the compression spring 381 forces the barrier connector 370 outwardly such that it extends into the slot 388. It then comes into contact with the side edges of the slot 388 and is retained within the slot 388 until the cam plate 376 causes the barrier connector 370 to be retracted and removed from the open-ended slot 388. It is noted that the second barrier 338 is similarly arranged.

As seen in FIGS. 6 and 10, the handle 340 may be mounted to a handle plate 390 that is rotatably mounted to the central support post 326. The handle 340 is fitted with spaced ears, shown at 392a and 392b (FIG. 10). The spaced ears 392 have aligned openings that receive an engaging mechanism 394. The engaging mechanism 394 may be in the form of an engaging pin 396 that is biased by a spring 398 to force the pin 396 into contact with the periphery of the ratchet wheel 350. With reference to FIG. 10, if the handle 340 is moved in a clockwise direction, the engaging pin 396 comes into contact with a shoulder 352 on the periphery of the ratchet wheel 350 and this causes the ratchet wheel 350 to rotate in a clockwise direction. If the handle 340 is moved in a counter-clockwise direction, the engaging pin 396 moves over a ramped surface 354 on the periphery of the ratchet wheel 350. This causes the engaging pin 396 to retract against the biasing spring 398. Thus, although the handle 340 is being moved in a counter-clockwise direction, the ratchet wheel 350 does not move with the handle 340. In this manner, operating the handle 340 by sequentially moving the handle 340 in a clockwise direction, then a counter-clockwise direction, then a clockwise direction, and so forth, causes the ratchet wheel 350 to move in a clockwise direction only. It will be appreciated that the ratchet wheel 350 will move in a clockwise direction in a series of short clockwise step movements.

The engaging mechanism 394 has a handle that may be rotated so as to manually disengage the pin 396 from the ratchet wheel 350 (by way of a cam and cam follower arrangement located between ear 392a and spring 398).

When the barrier connector 370 is engaged with the first barrier 336 as shown in FIGS. 4 to 6, 10 and 11, movement of the ratchet wheel 350 in the clockwise direction will also cause movement of the first barrier 336 in the clockwise direction. When the first barrier 336 has reached the desired position, the barrier connector 370 comes into contact with the camming surface 380 of the cam plate 376. This causes the barrier connector 370 to be retracted from the open-ended slot 388 such that the barrier connector 370 is no longer in contact or engagement with the first barrier. Thus, the retracted barrier connector 370 can rotate away from the first barrier 336. Once the barrier connector has rotated past the camming surface 380, it again extends. Continued rotation of the ratchet wheel 350 by the handle 340 causes the barrier connector to continue rotating until it comes into contact and engagement with the second barrier 338. The barrier connector 370 engages with the second barrier 330 in a manner that is essentially identical to that as described above with reference to engagement of the barrier connector 370 with the first barrier 336. Once that occurs, the second barrier 338 can be rotated by appropriate movement of the handle 340.

It will be appreciated that an operator may move the handle 340 in a series of alternating and short clockwise and counter-clockwise movements. Due to the interaction of the handle engaging mechanism 394 with the ratchet wheel 350, this causes the ratchet wheel 350 to move in a series of short clockwise steps in the clockwise direction only. When the barrier connector 370 is in engagement with the first barrier 336, this causes the first barrier 336 to also move in the clockwise direction only. The operator can rotate the barrier essentially throughout its full range of motion without having to move from a fixed position. The operator can operate the barrier from a location that is external to the enclosure, thereby minimising the risk of injury from the animals and also minimising the risk of baulking the animals in the enclosure. The handle is located at a height that is above the height of the animals in the enclosure. The handle does not need to move past any of the radial support struts in order to cause rotation of the barrier throughout a full range of rotation. This greatly increases the safety of the apparatus.

In some embodiments, additional actuating mechanisms that include handles, ratchet wheels and the other components as described with reference to FIGS. 4 to 11 may be included to enable separate and independent actuation of different barriers.

In other embodiments of the present invention, the barrier connector 370 may simply come into engagement with a part of the barrier (eg. numbered at 382a). The retainer 384 may not necessarily be required. The barrier connector itself may comprise a plate, a bar, a pin or indeed any other engaging member of suitable dimension and strength. The barrier connector may comprise a pin or a bar that extends into an opening in the barrier.

The apparatus of the present invention provides an animal enclosure and a barrier mechanism/actuation means that allows one or more barriers to be moved in an enclosure without requiring expensive hydraulic or pneumatic driving means. The barriers may be manually moved by an operator. The operator does not need to enter into the enclosure to move the barriers. The risk of injury from the operator coming into contact with and getting squashed between the radial support struts is negligible. As contact between people and the animals in the enclosure is minimised or eliminated, the animals may move through the enclosure in a more orderly manner. The enclosure is cost-effective.

Figure 12:
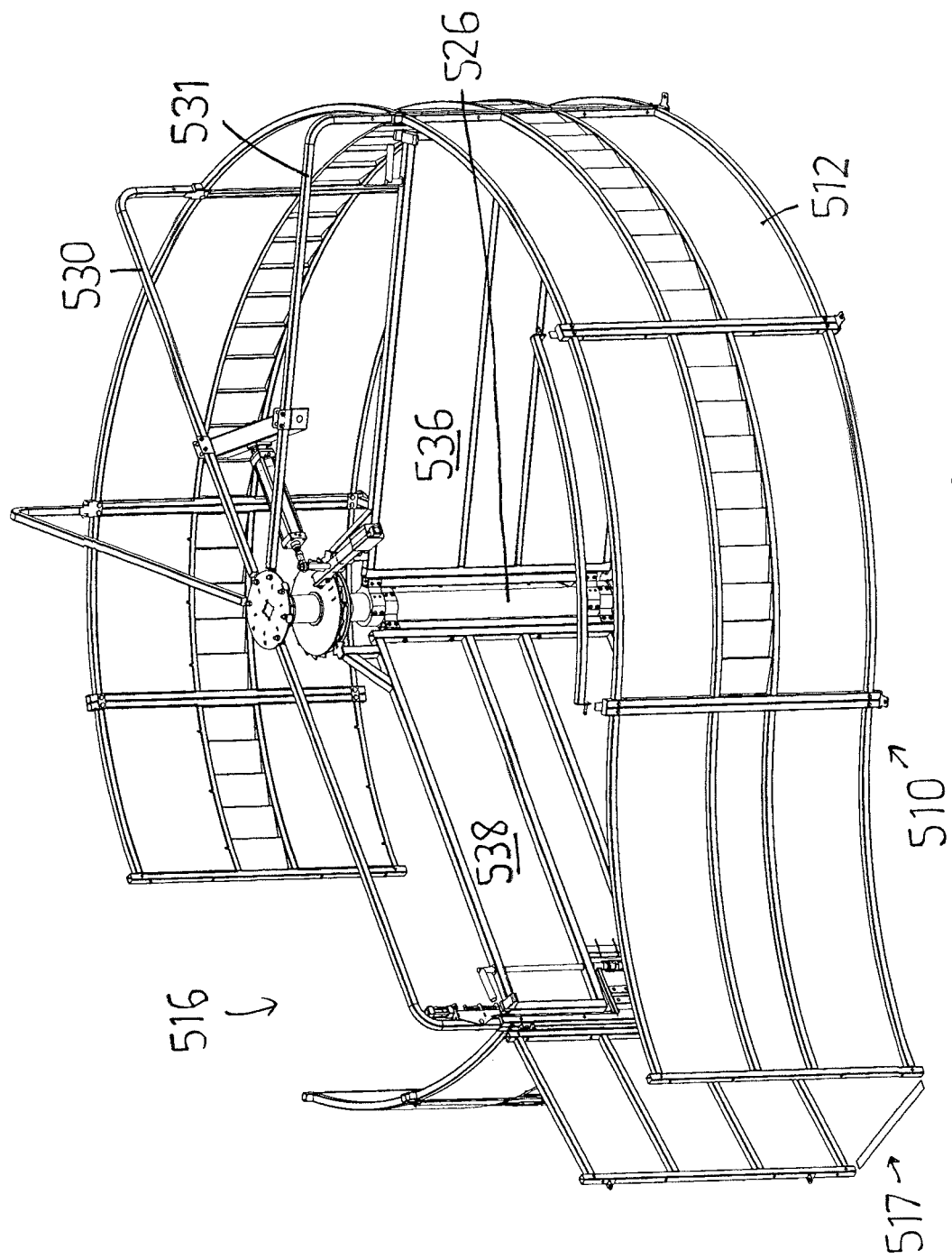
FIG. 12 shows a perspective view of an animal enclosure having barriers and a barrier mechanism, including actuation means for causing rotation of the barriers, in accordance with an embodiment of the present invention.
Figure 13:
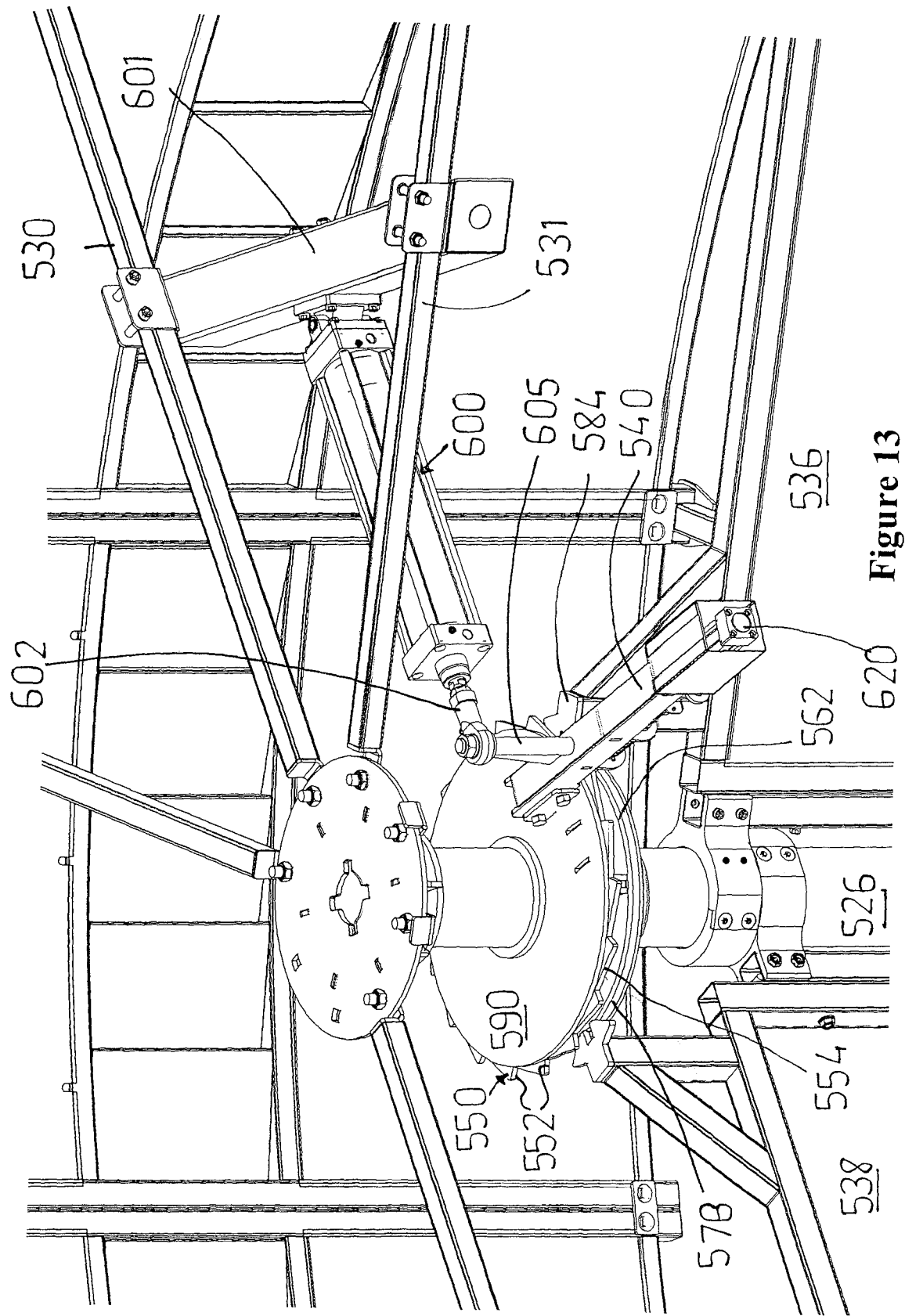
FIG. 13 shows a perspective view of some of the animal enclosure of FIG. 12, but mostly the actuation means and barriers.
Figure 14:
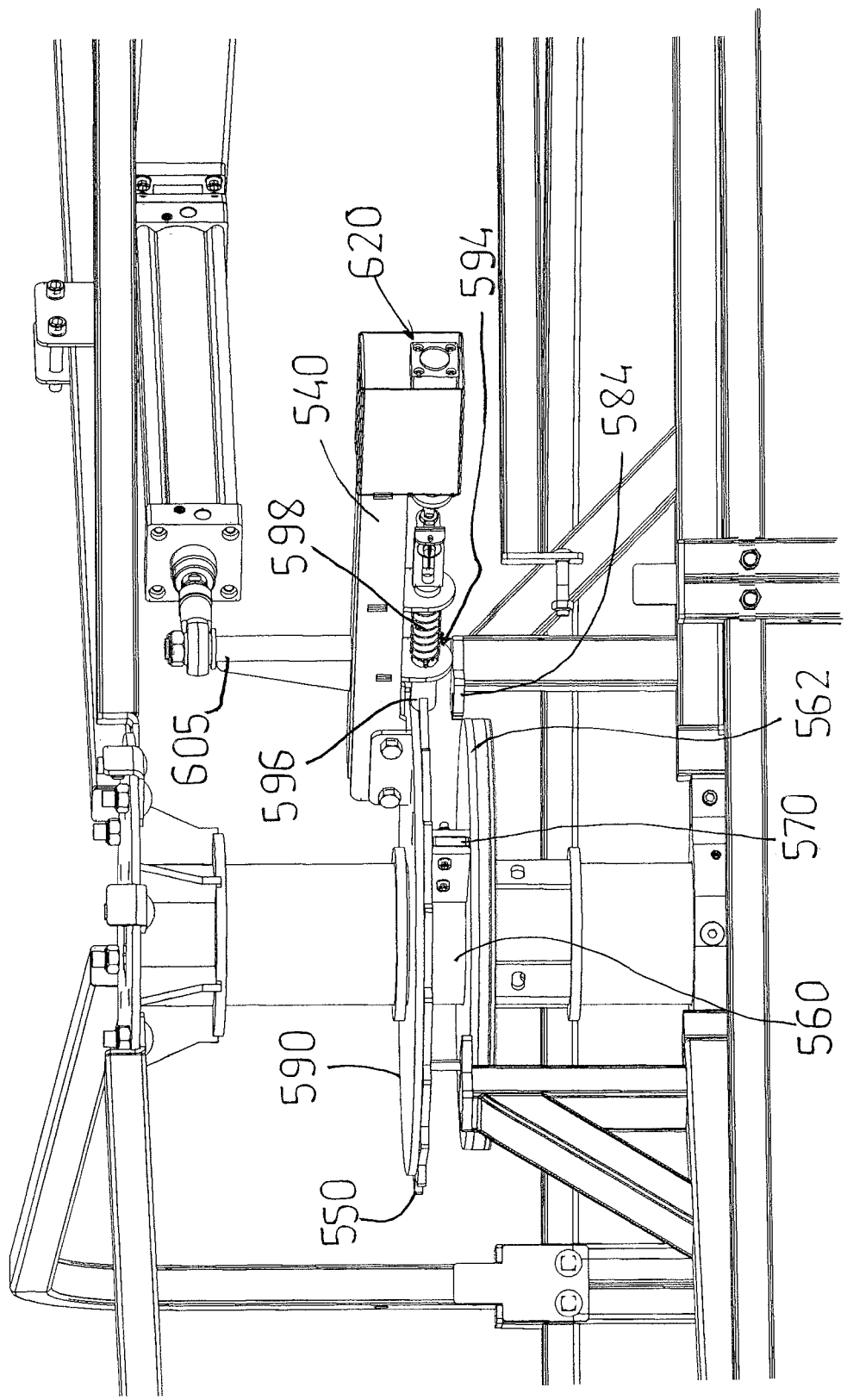
FIG. 14 is a close-up view of that shown in FIG. 5.

Another type of animal enclosure 510/moveable barrier mechanism is shown in FIGS. 12 to 14. In these figures, the features that are in common with the features shown in FIG. 1 will be denoted by a similar reference numeral but with a "5" added to the front.

The enclosure 510 has an external wall, generally denoted at 512, that is in the form of a circular wall or circular fence. The circular wall encircles an internal space in the enclosure. The enclosure 510 includes a first opening 516 and a second opening 517, serving as an entry point and exit, respectively. The enclosure 510 includes a central support post 526, as described previously.

As described for enclosure 10, enclosure 510 has a number of radial support struts (some of which are numbered at 530, 531) that are connected at their inner ends to the central support post 526. The enclosure 510 is provided with two internal barriers (gates) comprising a first barrier 536 and a second barrier 538. The first barrier 536 and the second barrier 538 are arranged such that they rotate around the central support post 526 by way of sleeves/collars, as described previously.

The figures show a barrier mechanism having actuation means that can be used to move internal barriers 536 and 538. The central support post 526 has a ratchet wheel 550 rotatably mounted thereto. The ratchet wheel 550 is most clearly shown in FIG. 13 where it can be seen that the ratchet wheel 550 has a periphery that includes a series of shoulders 552 that are separated by ramps 554.

The ratchet wheel 550 is connected via an intermediate sleeve 560 to a circular plate 562. Both ratchet wheel 550 and circular plate 562 rotate together by virtue of them being connected together.

The ratchet wheel 550 is fitted on its underside with two spaced ears that are used to slidably mount a barrier connector 570. The barrier connector 570 forms the barrier engagement means (moveable barrier engagement member) of the barrier mechanism, as described previously.

The enclosure/barrier mechanism is also provided with a cam plate 576, as described previously. Cam plate 576 is mounted in fixed position to the central support post 526.

The first barrier 536 is provided with a retainer 584 for retaining the barrier connector 570, as described previously. It is noted that the second barrier 538 is similarly arranged.

An actuator plate 590 is rotatably mounted to the central support post 526 co-planarly with the ratchet wheel 550.

The actuation means includes a pneumatic drive system that includes a pneumatic cylinder having a cylinder housing 600 and a piston 602 that is extendable and retractable relative to the housing 600. An end of the housing 600 is pivotally connected to a bracket 601 that is suspended between radial support struts 530 and 531.

A lever 540 is connected to actuator plate 590 and extends radially therefrom. A pin 605 extends at a right angle from the lever 540 and is connected to a working end of the piston 602.

The actuation means further includes a controller (actuator) that is located externally of the enclosure 510 (not shown). The controller enables the operator to extend and retract the piston 602 as required.

The lever 540 carries an engaging mechanism 594 essentially as described previously. The engaging mechanism 594 is in the form of an engaging pin 596 (see FIG. 14) that is biased by a spring 598 to force the pin 596 into contact with the periphery of the ratchet wheel 550. When extending the piston 602, the interconnected lever 540 rotates the actuator plate 590 in a clockwise direction, the engaging pin 596 comes into contact with a shoulder 552 on the periphery of the ratchet wheel 550 and this causes the ratchet wheel 550 to rotate in a clockwise direction. If the piston 602 retracts, the lever 540 and actuator plate 590 will move in a counter-clockwise direction, and the engaging pin 596 will move over a ramped surface 554 on the periphery of the ratchet wheel 550. This causes the engaging pin 596 to retract against the biasing spring 598. Thus, although the lever 540 is being moved in a counter-clockwise direction, the ratchet wheel 550 does not move with the lever 540. In this manner, extending and retracting the piston 602 causes the ratchet wheel 550 to move in a clockwise direction only. It will be appreciated that the ratchet wheel 550 will move in a clockwise direction in a series of short clockwise step movements.

The engaging mechanism 594 also includes a pneumatic cylinder 620 that is carried by the lever 540 and has a piston connected to an end of pin 596. When the piston extends relative to its cylinder housing, the pin 596 engages the ratchet wheel 550. When the piston retracts relative to its cylinder housing, the pin 596 disengages the ratchet wheel 550. When disengaged, the barrier 536 may be rotated freely about the vertical support member 526.

When the barrier connector 570 is engaged with the first barrier 536, movement of the ratchet wheel 550 in the clockwise direction will also cause movement of the first barrier 536 in the clockwise direction. When the first barrier 536 has reached the desired position, the barrier connector 570 comes into contact with the camming surface of the cam plate 576. This causes the barrier connector 570 to be retracted such that the barrier connector 570 is no longer in contact or engagement with the first barrier 536, as described previously.

Figure 15:
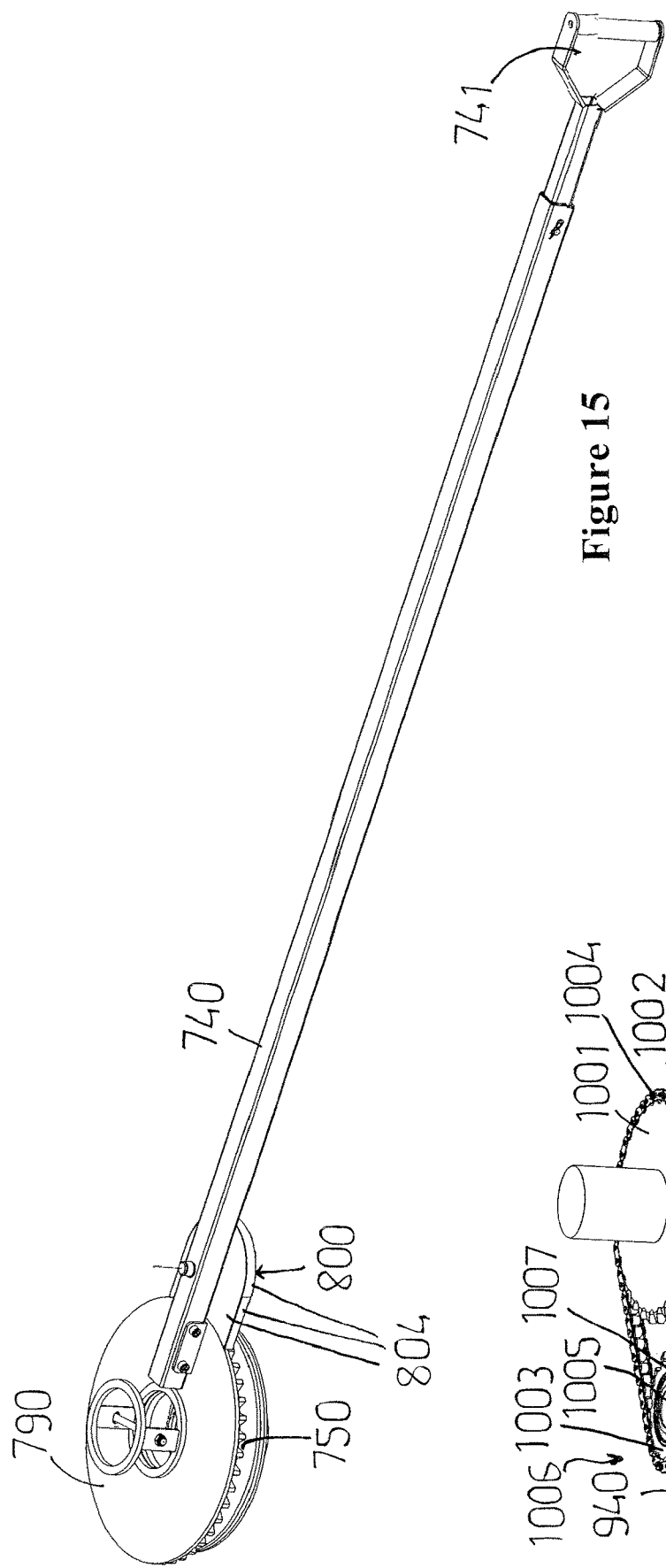
FIG. 15 shows a perspective view of a barrier mechanism having actuation means for causing rotation of a moveable barrier, in accordance with an embodiment of the present invention.
Figure 16:
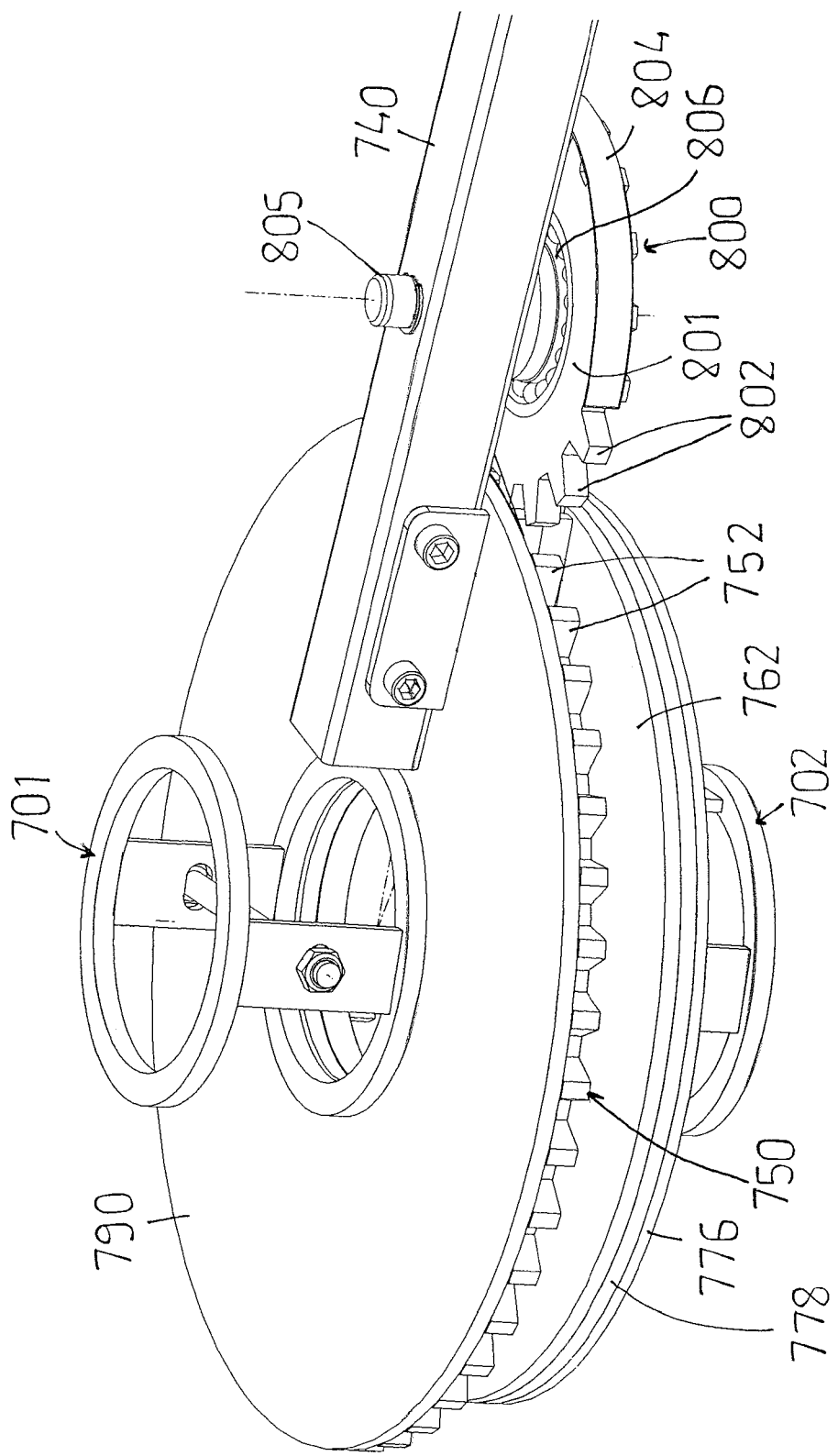
FIG. 16 is a close-up view of that shown in FIG. 15 but with some details removed for clarity.
Figure 17:
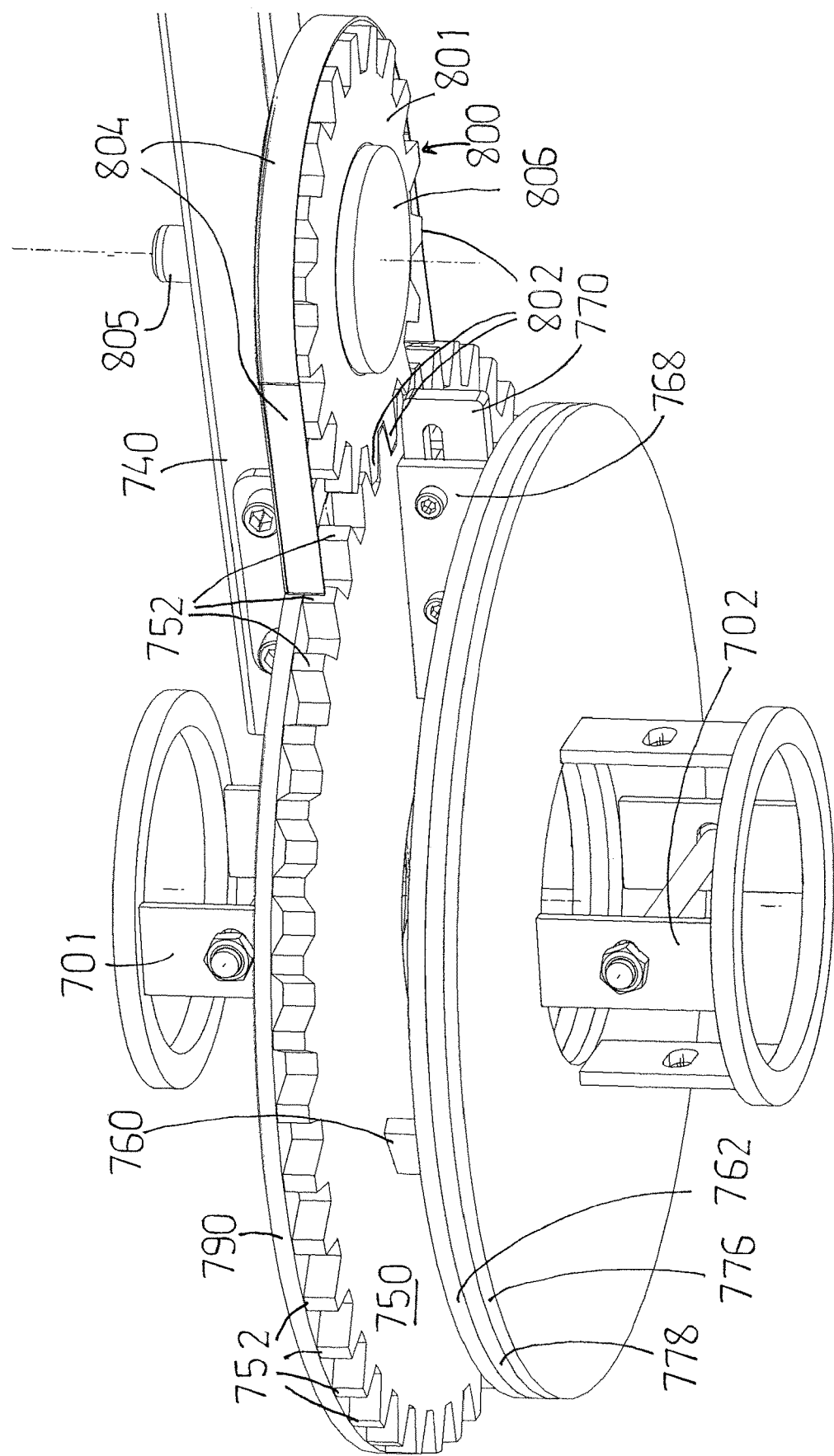
FIG. 17 is another close-up view of that shown in FIG. 15 but with some details removed for clarity.

Another type of moveable barrier mechanism is shown in FIGS. 15 to 17. In these figures, the features that are in common with the features shown in earlier figures will be denoted by a similar reference numeral but with a "7" added to the front.

In this embodiment, a gear tooth plate 750 is used in place of a ratchet wheel/plate. A periphery of the gear tooth plate 750 includes a series of teeth 752. The barrier assembly includes a handle plate 790, a circular plate 762 and a cam plate 776 that has an internal shoulder 778, each being as described previously.

The gear tooth plate 750 is mounted for rotation together with plate 762 about a central support post as described previously (not shown). The gear tooth plate 750 is connected via intermediate spacers 760 to plate 762. Both gear tooth plate 750 and circular plate 762 rotate together by virtue of them being connected together. Handle plate 790 is also mounted for rotation about the central support post. Cam plate 776 is unable to rotate about the central support post. These plates 790, 750, 776 are mounted relative to the central support post using an upper collar and bolt assembly 701 and a lower collar and bolt assembly 702.

The barrier mechanism includes a pair of spaced ears 768 and a barrier connector 770 for engaging a moveable barrier as described previously, as best seen in FIG. 17.

The barrier mechanism includes a handle 740 having an end connected to the handle plate 790 and another end located externally of the animal enclosure that includes a handgrip 741. The handle 740 can be rotated through a clockwise and counter-clockwise arc, essentially as described for the embodiment of FIG. 4.

The barrier mechanism includes a driver gear assembly 800 having a driver gear 801 with teeth 802 that intermesh with teeth 752 of the gear tooth plate 750, a housing 804 for the driver gear 801 that is mounted to the handle 740, and a shaft 805 mounting the driver gear 801 to the handle 740 via a one-way bearing (sprag or anti-reverse bearing) 806. The bearing 806 enables the meshed driver gear 801 to drive the large gear tooth plate 750 when rotated in one direction (clockwise), and when the handle 740 is rotated in the opposite direction, the driver gear 801 "free-wheels" in an un-driven state.

It will be appreciated that an operator may move the handle 740 in a series of alternating and short clockwise and counter-clockwise movements. Due to the interaction of the intermeshed teeth 802, 752, this causes the gear tooth plate 750 to move in a series of short clockwise steps in the clockwise direction only. When the barrier connector 770 is in engagement with a barrier, this causes the barrier to also move in the clockwise direction only. The operator can rotate the barrier essentially throughout its full range of motion without having to move from a fixed position. The operator can operate the barrier from a location that is external to the enclosure. The handle 740 does not need to move past any radial support struts in order to cause rotation of the barrier throughout a full range of rotation.

Figure 18:
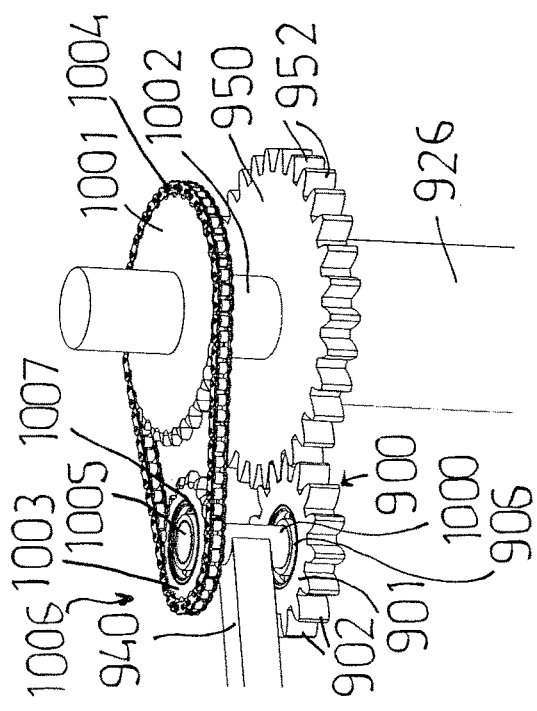
FIG. 18 shows a perspective view of a barrier mechanism having actuation means for causing rotation of a moveable barrier, in accordance with an embodiment of the present invention.

Another type of moveable barrier mechanism is partly shown in FIG. 18 and is a continuous drive variant of the embodiment shown in FIGS. 15 to 17. In this embodiment, the features that are in common with the features shown in earlier FIGS. 15 to 17 will be denoted by a similar reference numeral but with a "9" added to the front.

In this embodiment a gear tooth plate 950 includes a series of teeth 952. Although not shown, the barrier assembly includes a circular plate and a cam plate that has an internal shoulder, each being as described previously. The barrier mechanism also includes a barrier connector (not shown) for engaging a moveable barrier as described previously.

The gear tooth plate 950 is mounted for rotation about a central support post 926 as described previously. The gear tooth plate 950 is connected via intermediate spacers or a sleeve to the circular plate. Both gear tooth plate 950 and the circular plate rotate together by virtue of them being connected together. As previously described, cam plate is unable to rotate about the central support post 926.

The barrier mechanism includes a handle 940 having at one end a shaft 1000 and another end located externally of the animal enclosure that includes a handgrip (not shown). The handle 940 can be rotated through a clockwise and counter-clockwise arc, essentially as described for the embodiment of FIGS. 15 to 17.

The barrier mechanism includes a driver gear assembly 900 having a driver gear 901 with teeth 902 that intermesh with teeth 952 of the gear tooth plate 950. The driver gear assembly 900 includes a pin 1005 that mounts the driver gear 901 to the shaft 1000 via a one-way bearing 906. The bearing 906 enables the meshed driver gear 901 to drive the large gear tooth plate 950 when rotated in one direction (eg. clockwise), and when the handle 940 is rotated in the opposite direction (eg. counter-clockwise), the driver gear 901 "free-wheels".

The barrier mechanism further includes a drive wheel assembly 1006 which includes a toothed wheel 1001 mounted relative to the support post 926 such that it can rotate together with the gear tooth plate 950. A sleeve 1002 extends downwardly from the tooth wheel 1001 to the gear tooth plate 950.

The drive wheel assembly 1006 also includes a drive wheel 1003 mounted for rotation relative to the toothed wheel 1001. A chain or drive belt 1004, in the form of an endless chain or belt, extends around the toothed wheel 1001 and drive wheel 1003. The pin 905 mounting the driver gear 901 to the shaft 1000 via bearing 906 also mounts the drive wheel 1003 to shaft 1000 via a one-way bearing 1007 but in a reverse orientation to bearing 906. This configuration enables the drive wheel 1003 to drive the large gear tooth plate 950 when the handle 940 is rotated counter-clockwise, and when the handle 940 is rotated in the opposite direction (clockwise), the drive wheel 1003 "free-wheels" due to bearing 1007.

Although not shown, a handle plate, bracket, arm or other structure may be used to hold the driver gear assembly 900 and drive wheel assembly 1006 such that they remain fixed in location relative to wheel 1001 and plate 950. The handle plate, bracket, arm or other structure may extend from the central support post 926 or from another structure of the animal enclosure or barrier mechanism, such as a radial support strut. Pin 1005, for example, may pin the driver gear assembly 900 and drive wheel assembly 1006 to the handle plate, bracket, arm or other structure.

The configuration of bearings 906, 1007 provides a continuous drive, whereby when the handle 940 is rotated/moved clockwise or counter-clockwise, the gear tooth plate 950 continues to rotate only in the one (clockwise) direction. This embodiment provides advantages for an operator as described for various other embodiments. However, if desired, a hydraulic or pneumatic drive may be used to work the handle 940, essentially as described in FIGS. 12 to 14.

Although the embodiments show operation of the animal enclosure and barrier mechanism in a clockwise direction for movement of animals in that same direction, it is to be appreciated that the barrier mechanism and enclosure can be installed and operated in the reverse (counter-clockwise) direction. That is, the entire installation can be installed and operated in an opposite orientation so as to move animals in a counter-clockwise direction within the enclosure. That is, in some situations the operator may desire to move animals from left to right or from clockwise to counter-clockwise.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An animal enclosure comprising: a circular, partly circular or semicircular wall or fence, at least a first moveable barrier and a second moveable barrier located within the enclosure, wherein the first moveable barrier and the second moveable barrier are separately rotatable about the same vertical axis, and a rotation actuator that causes rotation of at least the first moveable barrier and the second moveable barrier, the rotation actuator being operable by an operator, the rotation actuator comprising a part or a portion located externally of the enclosure to thereby allow an operator to move at least the first moveable barrier and the second moveable barrier from a location that is external to the enclosure; wherein both the first moveable barrier and the second moveable barrier are moveable by operation of the rotation actuator.

2. The animal enclosure of claim 1, comprising a central support member and a plurality of radial support members extending from the central support member to the circular, partly circular or semicircular external wall or fence, adjacent ones of the plurality of radial support members forming an angle to each other such that outer ends of the adjacent ones of the radial support members are spaced from each other, and wherein the rotation actuator is arranged such that an operator may remain within a space subtended by adjacent ones of the radial support members and external to the enclosure during operation of the rotation actuator to cause rotation of at least one of the first moveable barrier and the second moveable barrier.

3. The animal enclosure of claim 1 wherein the part or portion of the rotation actuator located externally of the enclosure is operatively connected to at least one drive system of the rotation actuator.

4. The animal enclosure of claim 3, further comprising at least one drive system engager that selectively engages and disengages the part or portion of the rotation actuator located externally of the enclosure with and from the at least one drive system.

5. The animal enclosure of claim 3, further comprising at least one moveable barrier engager that selectively engages with or disengages from at least one of the first moveable barrier and the second moveable barrier such that when the at least one moveable barrier engager is engaged with at least one of the first moveable barrier and the second moveable barrier, operation of the part or portion of the rotation actuator located externally of the enclosure causes at least one of the first moveable barrier and the second moveable barrier to rotate, and when the at least one moveable barrier engager is disengaged from at least one of the first moveable barrier and the second moveable barrier, operation of the part or portion of the rotation actuator located externally of the enclosure does not cause at least one of the first moveable barrier and the second moveable barrier to rotate.

6. The animal enclosure of claim 5, wherein:
   (i) at least one of the first moveable barrier and the second moveable barrier are adapted to be engaged or disengaged from the rotation actuator without the need of intervention or separate activation by the operator; or
   (ii) the at least one barrier engager comprises at least one moveable barrier engagement member moveable between an engagement position at which the at least one barrier engagement member engages with at least one of the first moveable barrier and the second moveable barrier and a disengaged position at which the at least one barrier engagement member is not engaged with at least one of the first moveable barrier and the second moveable barrier; or
   (iii) the rotation actuator comprises at least one system selected from the group consisting of a ratchet system, wedge locking cam locking system, sprocket system and gear system that allows the at least one barrier to be rotated by operating the part or portion of the rotation actuator located externally of the enclosure.

7. The animal enclosure of claim 5, wherein the rotation actuator comprises at least one ratchet system that allows at least one of the first moveable barrier and the second moveable barrier to be rotated in a first direction by moving the part or portion of the rotation actuator located externally of the enclosure in the first direction, the at least one ratchet system allowing the part or portion of the rotation actuator located externally of the enclosure to move in a second direction opposite to the first direction whilst not causing movement of at least one of the first moveable barrier and the second moveable barrier in the second direction.

8. The animal enclosure of claim 5, wherein the rotation actuator comprises at least one ratchet system that allows at least one of the first moveable barrier and the second moveable barrier to be rotated in a first direction by moving the part or portion of the rotation actuator located externally of the enclosure in the first direction, the at least one ratchet system allowing the part or portion of the rotation actuator located externally of the enclosure to move in a second direction opposite to the first direction causing movement of at least one of the first moveable barrier and the second moveable barrier to move in the first direction.

9. A moveable barrier mechanism for moving at least a first moveable barrier and a second moveable barrier located within an animal enclosure comprising a circular, partly circular or semicircular wall or fence, wherein the first moveable barrier and the second moveable barrier are separately rotatable about the same vertical axis; wherein the moveable barrier mechanism comprises: a rotation actuator that causes rotation of at least the first moveable barrier and the second moveable barrier, the rotation actuator being operable by an operator, the rotation actuator comprising a part or a portion located externally of the enclosure to thereby allow an operator to move at least the first moveable barrier and the second moveable barrier from a location that is external to the enclosure; wherein both the first moveable barrier and the second moveable barrier are moveable by operation of the rotation actuator.

10. The moveable barrier mechanism of claim 9, wherein the part or portion of the rotation actuator located externally of the enclosure is operatively connected to at least one drive system of the rotation actuator.

11. The moveable barrier mechanism of claim 10, wherein the at least one drive system is selected from the group consisting of at least one pulley drive system, cog drive system, worm drive system, rack and pinion gear system, ratchet system, wheel drive system, sprocket system, gear system, wedge locking system, cam locking system, pneumatic drive system and hydraulic drive system.

12. The moveable barrier mechanism of claim 10, further comprising at least one drive system engager that selectively engages and disengages the part or portion of the rotation actuator located externally of the enclosure with and from the at least one drive system.

13. The moveable barrier mechanism of claim 10, further comprising at least one moveable barrier engager that selectively engages with or disengages from at least one of the first moveable barrier and the second moveable barrier such that when the at least one moveable barrier engager is engaged with at least one of the first moveable barrier and the second moveable barrier, operation of the part or portion of the rotation actuator located externally of the enclosure causes at least one of the first moveable barrier and the second moveable barrier to rotate, and when the at least one moveable barrier engager is disengaged from at least one of the first moveable barrier and the second moveable barrier, operation of the part or portion of the rotation actuator located externally of the enclosure does not cause at least one of the first moveable barrier and the second moveable barrier to rotate.

14. The moveable barrier mechanism of claim 13, wherein at least one of the first moveable barrier and the second moveable barrier are adapted to be engaged or disengaged from the rotation actuator without the need of intervention or separate activation by the operator.

15. The moveable barrier mechanism of claim 13, wherein the at least one barrier engager comprises at least one moveable barrier engagement member moveable between an engagement position at which the at least one barrier engagement member engages with at least one of the first moveable barrier and the second moveable barrier and a disengaged position at which the at least one barrier engagement member is not engaged with at least one of the first moveable barrier and the second moveable barrier.

16. The moveable barrier mechanism of claim 15, further comprising at least one camming member to move the at least one barrier engagement member from the engaged position to the disengaged position.

17. The moveable barrier mechanism of claim 13, wherein the rotation actuator comprises at least one system selected from the group consisting of a ratchet system, wedge locking cam locking system, sprocket system and gear system that allows the at least one barrier to be rotated by operating the part or portion of the rotation actuator located externally of the enclosure.

18. The moveable barrier mechanism of claim 13, wherein the rotation actuator comprises at least one ratchet system that allows at least one of the first moveable barrier and the second moveable barrier to be rotated in a first direction by moving the part or portion of the rotation actuator located externally of the enclosure in the first direction, the at least one ratchet system allowing the part or portion of the rotation actuator located externally of the enclosure to move in a second direction opposite to the first direction whilst not causing movement of at least one of the first moveable barrier and the second moveable barrier in the second direction.

19. The moveable barrier mechanism of claim 13, wherein the rotation actuator comprises at least one ratchet system that allows at least one of the first moveable barrier and the second moveable barrier to be rotated in a first direction by moving the part or portion of the rotation actuator located externally of the enclosure in the first direction, the at least one ratchet system allowing the part or portion of the rotation actuator located externally of the enclosure to move in a second direction opposite to the first direction causing movement of at least one of the first moveable barrier and the second moveable barrier to move in the first direction.

20. A moveable barrier mechanism for moving at least a first moveable barrier and a second moveable barrier located within an animal enclosure comprising a circular, partly circular or semicircular wall or fence, wherein the first moveable barrier and the second moveable barrier are separately rotatable about the same vertical axis, the moveable barrier mechanism comprising: a rotation actuator that causes rotation of at least the first moveable barrier and the second moveable barrier, the rotation actuator being operable by an operator, the rotation actuator comprising a part or a portion located externally of the enclosure to thereby allow an operator to move at least the first moveable barrier and the second moveable barrier from a location that is external to the enclosure, wherein the part or portion of the rotation actuator located externally of the enclosure is operatively connected to at least one drive system of the rotation actuator, and the moveable barrier mechanism further comprises at least one drive system engager that selectively engages and disengages the part or portion located externally of the enclosure with and from the at least one drive system.

21. A moveable barrier mechanism for moving at least a first moveable barrier and a second moveable barrier located within an animal enclosure comprising a circular, partly circular or semicircular wall or fence, wherein the first moveable barrier and the second moveable barrier are separately rotatable about the same vertical axis, wherein the moveable barrier mechanism comprises: a rotation actuator that causes rotation of at least the first moveable barrier and the second moveable barrier, the rotation actuator being operable by an operator, the rotation actuator comprising a part or a portion located externally of the enclosure to thereby allow an operator to move at least the first moveable barrier and the second moveable barrier from a location that is external to the enclosure, wherein the part or portion of the rotation actuator located externally of the enclosure is operatively connected to at least one drive system of the rotation actuator, and the moveable barrier mechanism further comprises at least one moveable barrier engager that selectively engages with or disengages from at least one of the first moveable barrier and the second moveable barrier such that when the at least one moveable barrier engager is engaged with at least one of the first moveable barrier and the second moveable barrier, operation of the part or portion of the rotation actuator located externally of the enclosure causes at least one of the first moveable barrier and the second moveable barrier to rotate, and when the at least one moveable barrier engager is disengaged from at least one of the first moveable barrier and the second moveable barrier, operation of the part or portion of the rotation actuator located externally of the enclosure does not cause at least one of the first moveable barrier and the second moveable barrier to rotate.

* * * * *